United States Patent
Chen et al.

(10) Patent No.: US 12,022,554 B2
(45) Date of Patent: Jun. 25, 2024

(54) N2 NOTIFICATION PROCEDURE IMPROVEMENT

(71) Applicant: Telefonaktiebolaget LM Ericsson (publ), Stockholm (SE)

(72) Inventors: Qian Chen, Mölndal (SE); Hans Bertil Rönneke, Kungsbacka (SE); Paul Schliwa-Bertling, Ljungsbro (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 43 days.

(21) Appl. No.: 16/755,489

(22) PCT Filed: Oct. 12, 2018

(86) PCT No.: PCT/EP2018/077967
§ 371 (c)(1),
(2) Date: Apr. 10, 2020

(87) PCT Pub. No.: WO2019/073070
PCT Pub. Date: Apr. 18, 2019

(65) Prior Publication Data
US 2021/0298112 A1 Sep. 23, 2021

Related U.S. Application Data

(60) Provisional application No. 62/572,079, filed on Oct. 13, 2017.

(51) Int. Cl.
*H04W 76/27* (2018.01)
*H04W 8/02* (2009.01)
*H04W 68/00* (2009.01)

(52) U.S. Cl.
CPC ............ *H04W 76/27* (2018.02); *H04W 8/02* (2013.01); *H04W 68/005* (2013.01)

(58) Field of Classification Search
CPC ...... H04W 76/27; H04W 68/005; H04W 8/02
See application file for complete search history.

(56) References Cited

U.S. PATENT DOCUMENTS

2012/0096154 A1* 4/2012 Chen ................ H04W 4/70
709/224
2013/0215834 A1* 8/2013 Deivasigamani ..... H04W 76/27
370/329

(Continued)

FOREIGN PATENT DOCUMENTS

CN 105830476 A 8/2016
WO 2017043854 A1 3/2017

(Continued)

OTHER PUBLICATIONS

International Search Report and Written Opinion issued in International Application No. PCT/EP2018/077967 dated Feb. 12, 2019 (10 pages).

(Continued)

*Primary Examiner* — Christine Ng
(74) *Attorney, Agent, or Firm* — Rothwell, Figg, Ernst & Manbeck, P.C.

(57) ABSTRACT

Embodiments herein relate to a method for providing state information regarding a user equipment, UE, performed by a radio access node, RAN, and an Access and Mobility Management Function, AMF, respectively. Embodiments here in relate also to a RAN and an AMF configured to perform a method for providing state information regarding a UE.

25 Claims, 21 Drawing Sheets

(56) References Cited

U.S. PATENT DOCUMENTS

| | | | |
|---|---|---|---|
| 2015/0373608 A1* | 12/2015 | Zhu | H04W 76/25 |
| | | | 370/252 |
| 2016/0323737 A1 | 11/2016 | Fransen | |
| 2016/0330602 A1 | 11/2016 | Das et al. | |
| 2017/0048702 A1 | 2/2017 | Barrett et al. | |
| 2018/0198867 A1* | 7/2018 | Dao | H04W 36/14 |
| 2019/0159282 A1* | 5/2019 | Zhu | H04W 76/18 |
| 2019/0394711 A1* | 12/2019 | Kim | H04W 60/005 |
| 2020/0128420 A1* | 4/2020 | Ryu | H04W 76/27 |

FOREIGN PATENT DOCUMENTS

| | | |
|---|---|---|
| WO | 2017126942 A1 | 7/2017 |
| WO | 2018/060968 A1 | 4/2018 |

OTHER PUBLICATIONS

Ericsson, "Finalizing the UE Reachability Procedure with RRC Inactive handling (OI#13)", SA WG2 Meeting #123 S2-176995, Ljubljana, Slovenia, XP051359691, Oct. 2017 (5 pages).

Ericsson, "RRC Inactive state notification support in TS 23.502", SA WG2 Meeting #122bis, S2-175390, Sofia Antipolis, France, XP051334912, Aug. 2017 (6 pages).

Ericsson, "RRC Inactive state notification support in TS 23.502", S2-175390, SA WG2 Meeting #122bis, S2-175390, XP051325243, Aug. 2017 (6 pages).

Ericsson, "TS 23.502: 5GS Terminology and other corrections", SA WG2 Meeting #122E e-meeting, S2-176778, Elbonia, XP051336088, Sep. 2017 (159 pages).

3GPP TS 23.502 V1.2.0 (Sep. 2017), 3rd Generation Partnership Project; Technical Specification Group Services and System Aspects; Procedures for the 5G System; Stage 2 (Release 15), Sep. 2017 (165 pages).

Huawei, et al., "TS 23.502 SMF information context synchronization between old AMF and new AMF," SA WG2 Meeting #122B, S2-175643, Sophia Antipolis, France, Aug. 21-25, 2017 (17 pages).

\* cited by examiner

N2 NOTIFICATION PROCEDURE IMPROVEMENT

CROSS REFERENCE TO RELATED APPLICATION(S)

This application is a 35 U.S.C. § 371 National Stage of International Patent Application No. PCT/EP2018/077967, filed Oct. 12, 2018, designating the United States and claiming priority to U.S. provisional application No. 62/572,079, filed on Oct. 13, 2017. The above identified applications are incorporated by reference.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

3GPP TS 23.502 v 1.2.0 ("TS 23.502") has introduced the N2 notification procedure for AMF to request RAN report RRC state information. And it also introduced a Reachability procedure for UDM to request AMF/RAN to report the UE reachability info. A portion of section 4.8.3 of TS 23.501 is reproduced below:

4.8.3 N2 Notification procedure

This procedure is used by an AMF to request the RAN to report RRC state information, when the target UE is in CM-CONNECTED state. When AMF has requested reporting of subsequent state changes, the need for the RAN to continue reporting ceases when the UE transitions to CM-IDLE or the AMF sends a cancel indication. This procedure may be used for services that require RRC state information (e.g. 5GC MT control and paging assistance, O&M and collection of statistics), or for subscription to the service by other NFs.

Reporting of RRC state transitions can be requested per UE by AMF. Continuous reporting of all RRC state transitions can be enabled by operator local configuration.

With reference to FIG. 1 (see also FIG. 4.8.3-1 of TS 23.502), the N2 notification procedure may include the following steps:

Step 1. The AMF sends a UE State Transition Notification Request message to the RAN. The UE State Transition Notification Request message shall identify the UE for which notification(s) are requested, and may contain a reporting type value (i.e., a value indicating a reporting type, which may value may be referred to as a "reporting type indicator"). The reporting type value indicates whether subsequent state transitions shall also be notified.

Step 2. The RAN sends the UE Notification message to report the current RRC state for the UE (i.e. RRC-Inactive state or RRC-Connected state). The current UE location information (i.e. TAI+Cell Identity) is always included when RRC state information is reported. When the AMF has requested reporting about subsequent state transitions, the RAN sends subsequent UE Notification messages to the AMF at every RRC state transition until the UE transitions to CM-IDLE or RAN receives a Cancel UE State Notification message from the AMF.

Step 3. The AMF can send a Cancel UE State Notification message to inform the RAN that it should terminate notifications for a given UE. This message should only be used when notification(s) about subsequent state transitions was requested.

TS 23.502 also describes a UE "Reachability" procedure in section 4.2.5. This sections states:

4.2.5 Reachability procedures 4.2.5.1 General

Elements of this procedure can be used by both "SMS over NAS" and UDM initiated UE Reachability Notification requests.

The procedure can be used where UE's are in RRC-Idle, RRC-Inactive or RRC-Connected states.

There are two procedures necessary for any service related entity that would need to be notified by the reachability of the UE:

UE Reachability Notification Request procedure; and
UE Activity Notification procedure.

The UE Reachability Notification Request procedure is illustrated in FIG. 4.2.5.2-1 of TS 23.502 (see FIG. 2 of the present document). This procedure may include the following steps:

0. During the Registration or subscription update procedure, the UDM informs the AMF of the identities (e.g. FQDNs) of the Network Functions that are authorised to request notifications on this UE's reachability via Nudm_UEContextManagement_Registration or Nudm_SubscriberData_Update service operation. By default, the UDM may be automatically authorised.

1. If a service-related entity requests the UDM to provide an indication regarding UE reachability, the UDM checks that that entity is authorised to perform this request on this subscriber.

If the entity is not authorised, the request may be rejected (e.g. if the requesting entity is recognised as being a valid entity, but not authorised for that subscriber) or silently discarded (e.g. if the requesting entity is not recognised). Appropriate O&M reports are generated.

2 The UDM stores the identity of the service-related entity and sets the URRP-AMF parameter to indicate that such request is received. If the value of URRP-AMF parameter has changed from "not set" to "set", the UDM initiates Namf_EventExposure_Subscribe_service operation (URRP-AMF) to the AMF. The UDM may also need to send this message to an MME and/or to an entity handling non-3GPP access.

3 The AMF checks that the requesting entity is authorised to perform this request on this subscriber.

If the entity is not authorised, the request may be rejected (e.g. if the requesting entity is recognised as being a valid entity, but not authorised for that subscriber) or silently discarded (e.g. if the requesting entity is not recognised). Appropriate O&M reports are generated.

If the AMF has a MM Context for that user, the AMF sets URRP-AMF to indicate the need to report to the UDM information regarding changes in UE reachability, e.g. when the next NAS activity with that UE is detected.

NOTE: The AMF may set the URRP-AMF even if the AMF believes that the UE is in RRC-Connected or RRC-Inactive state. This may be useful, for example, if the next contact from the UE is via a different RAN node.

The UE Activity Notification procedure is illustrated in FIG. 4.2.5.3-1 of TS 23.502 (see FIG. 3 of the present document). This procedure may include the following steps:

1) The AMF receives an indication regarding UE reachability, e.g. a Registration Request or Service Request message from the UE, or a UE Reachability Indication from the RAN.
2) If the AMF contains an MM context of the UE and if URRP-AMF for that UE is configured to report once that the UE is reachable, the AMF shall initiate Namf_EventExposure_Notify service operation (SUPI, UE-Reachable) message to the UDM and clears the corresponding URRP-AMF for that UE.
3) When the UDM receives the Namf_EventExposure_Notify service operation (SUPI, UE-Reachable) message or Nudm_UEContextManagement_Registration service for a UE that has URRP-AMF set, it triggers appropriate notifications to the NFs (e.g. SMSF or SMS-GMSC) that have subscribed to the UDM for this notification and clears the URRP-AMF for that UE.

TS 23.502 has also introduced certain services in the AMF which can allow other NFs to request the AMF to put a UE in the CM-CONNECTED state before any downlink data/signaling comes to AMF/UPF. Specifically, section 5.2.2.4 of TS 23.502 states:

---

5.2.2.4 Namf_MT service 5.2.2.4.1 General

Service description: It provides a NF a service that may ensure that the UE is reachable to send MT signaling or data. The following are the key functionalities of this NF service paging UE if UE is in IDLE state and respond to other NF after the UE enters CM-CONNECTED state.

response to the requester NF if UE is in CONNECTED state.

5.2.2.4.2 Namf_MT_EnableUEReachability service operation

Service operation name: Namf_MT_EnableUEReachability.

Description: The consumer NF uses this service operation to request enabling UE reachability.

Known NF Consumers: SMSF

Inputs, Required: NF ID, UE ID.

Inputs, Optional: None.

Outputs, Required: None.

Outputs, Optional: None.

See step 3 of clause 4.2.3.4 for details on the usage of this service operation, and 4.2.2.3.3 for UDM initiated de-registration.

The consumer NF may not need to know UE state. The AMF may accept the request and respond to the consumer NF immediately if UE is in CM-CONNECTED state. If the UE is in CM-IDLE state, the AMF may page the UE and respond to the consumer NF after the UE enters CM-CONNECTED state.

---

SUMMARY

There currently exist certain challenge(s).

For example, in the current UE reachability procedure, there are messages/steps between AMF and RAN that can be replaced by the N2 UE notification procedure. However, the current "reporting type" in the N2 UE notification procedure is not optimized for a UE reachability procedure. If the N2 notification procedure were used to perform this reachability function, it could generate excess signaling.

Additionally, when AMF is required to put UE in CM-CONNECTED and RRC-Connected mode, without downlink data, N1, and/or N2 signaling, there is no procedure between AMF and RAN on N2 interface to achieve this requirement.

Certain aspects of the present disclosure and their embodiments may provide solutions to these or other challenges. For example, a reporting type value (e.g., "RRC-Connected state notification") may be used. This reporting type value may be used to facilitate UE reachability procedures, such as those described above. Additionally, a flag (e.g., "Enable Reachability indicator") may be used in the N2 UE notification procedure. This flag may be used to enable immediate UE reachability, and/or to let AMF indicate to RAN that a UE shall be paged first before reporting UE information back to AMF if the UE is currently in RRC-Inactive state.

There are, proposed herein, various embodiments which address one or more of the issues disclosed herein.

Certain embodiments may provide one or more of the following technical advantage(s). For example, some embodiments may provide optimized procedures by which an AMF may request a RAN to perform RAN paging without downlink data or a N1/N2 message. Some embodiments may further provide an optimized reporting type for RAN to report necessary UE information towards AMF.

In other words, there is provided a method for obtaining state information regarding a user equipment, UE, the method comprising an AMF transmitting to a radio access node, RAN, a notification request identifying the UE. The request comprising an instruction for configuring the RAN such that, in a case where the RAN, in response to the notification request, transmits to the AMF a first notification indicating that the UE is in a radio resource control, RRC-, inactive state, the RAN: (i) transmits a second notification to the AMF in response to the notification request, wherein the second notification indicates that the UE is in an RRC-connected state and (ii) ceases transmitting further subsequent notifications as a result of transmitting the second notification. The AMF receiving the first notification from the RAN, the first notification comprising an indication regarding the RRC connection state of the UE.

In embodiments, the request is a UE State Transition Notification Request and the instruction is a reporting type indicator.

In embodiments, the reporting type indicator is an RRC-Connected state notification.

In embodiments, the instruction is further configured for causing the RAN to transmit no other notifications between the first notification and the second notification.

In embodiments, the method further comprises receiving a message from a core network, CN, node, the message from the CN node comprising an instruction to put the UE in the RRC-connected state.

In embodiments, the notification request is configured for causing the RAN to transmit the first notification after paging the UE.

In embodiments, the first notification comprises UE location information.

In embodiments, the UE location information comprises cell identity information and tracking area identity (TAI) information.

In embodiments, the notification request is further configured for causing the RAN to, determine a radio resource control, RRC, state of the UE, and as a result of determining that the UE is in a RRC-connected state, transmit the notification to the AMF without paging the UE.

In embodiments, the notification request further comprises a reachability indicator for causing the RAN to (i) determine a radio resource control (RRC) connection state of the UE, and (ii) page the UE as a result of the RAN determining that the UE is in a RRC-Inactive state.

In embodiments, the notification request is further configured for causing the RAN to transmit no other notifications regarding the RRC connection state of the UE between the steps of determining the RRC connection state of the UE and transmitting the first notification to the AMF.

Further, there is provided a method, performed by a radio access node, RAN, for providing state information regarding a user equipment, UE. The method comprising receiving from an access and mobility function, AMF, a notification request identifying the UE and comprising a reporting type indicator. In response to receiving the notification request: transmitting to the AMF a first notification indicating that the UE is in an inactive state; after transmitting to the AMF the first notification, detecting that the UE has transitioned from the inactive state to an active state. Subsequent to detecting that the UE has transitioned from the inactive state to an active state, transmitting to the AMF a second notification indicating that the UE is in the active state; and subsequent to transmitting the second notification indicating that the UE is in the active state, refraining from transmitting to the AMF further notifications responsive to the notification request.

In embodiments, the notification request is a UE State Transition Notification Request.

In embodiments, the reporting type indicator is an RRC-Connected state notification.

In embodiments, refraining from transmitting to the AMF further notifications responsive to the notification request is performed as a result of the second notification indicating that the UE is in the active state.

In embodiments, no other notifications between the first notification and the second notification are transmitted.

In embodiments, the notification request is configured for causing the RAN to transmit the first notification after paging the UE.

In embodiments, the first notification comprises UE location information.

In embodiments, the UE location information comprises cell identity information and tracking area identity, TAI, information.

In embodiments, the notification request is further configured for causing the RAN to, determine a radio resource control, RRC, state of the UE, and as a result of determining that the UE is in an RRC-connected state, transmit the notification to the AMF without paging the UE.

In embodiments, the notification request further comprises a reachability indicator for causing the RAN to (i) determine a radio resource control (RRC) connection state of the UE, and (ii) page the UE as a result of the RAN determining that the UE is in an RRC-Inactive state.

In embodiments, the notification request is further configured for causing the RAN to transmit no other notifications regarding the RRC connection state of the UE between the steps of determining the RRC connection state of the UE and transmitting the first notification to the AMF.

Further, there is provided a Radio access network node, RAN, being configured to: receive from an access and mobility function, AMF, a notification request identifying the UE and comprising a reporting type indicator. In response to receiving the notification request: transmit to the AMF a first notification indicating that the UE is in an inactive state. After transmitting to the AMF the first notification, detecting that the UE has transitioned from the inactive state to an active state. Subsequent to detecting that the UE has transitioned from the inactive state to an active state, transmit to the AMF a second notification indicating that the UE is in the active state; and subsequent to transmitting the second notification indicating that the UE is in the active state, refrain from transmitting to the AMF further notifications responsive to the notification request.

In embodiments, the notification request is a UE State Transition Notification Request.

In embodiments, the reporting type indicator is an RRC-Connected state notification.

In embodiments, the RAN is configured to perform the method of according to any one of embodiments above.

Still further, there is provided a method performed by an Access and Mobility Management Function, AMF, for obtaining state information regarding a user equipment, UE. The method comprising: transmitting to a radio access node, RAN, a notification request identifying the UE and comprising a reporting type indicator indicating the AMF requesting to i) receive, in response to the notification request, a first notification from the RAN indicating that the UE is in a radio resource control, RRC-, inactive state; and ii) receive, subsequent to the RAN detecting that the UE has transitioned from the inactive to an active state, a second notification from the RAN indicating that the UE is in an RRC-connected state. The AMF receiving the first notification from the RAN, the first notification comprising an indication regarding the RRC connection state of the UE.

In embodiments, the notification request is a UE State Transition Notification Request.

In embodiments, the reporting type indicator is an RRC-Connected state notification.

In embodiments, the reporting type indicator is further configured for causing the RAN to transmit no other notifications between the first notification and the second notification.

In embodiments, the method further comprises receiving a message from a core network, CN, node, the message from the CN node comprising an instruction to put the UE in the RRC-connected state.

In embodiments, the notification request is configured for causing the RAN to transmit the first notification after paging the UE.

In embodiments, the first notification comprises UE location information.

In embodiments, the UE location information comprises cell identity information and tracking area identity, TAI, information.

In embodiments, the notification request is further configured for causing the RAN to, determine a radio resource control, RRC, state of the UE, and as a result of determining that the UE is in an RRC-connected state, transmit the notification to the AMF without paging the UE.

In embodiments, the notification request further comprises a reachability indicator for causing the RAN to (i) determine a radio resource control, RRC, connection state of the UE, and (ii) page the UE as a result of the RAN determining that the UE is in a RRC-Inactive state.

In embodiments, the notification request is further configured for causing the RAN to transmit no other notifications regarding the RRC connection state of the UE between the steps of determining the RRC connection state of the UE and transmitting the first notification to the AMF.

There is still further provided an Access and Mobility Management Function, AMF, being configured to: transmit to a radio access node, RAN, a notification request identifying the UE and comprising a reporting type indication indicating the AMF requesting to i) receive, in response to the notification request, a first notification from the RAN indicating that the UE is in a radio resource control, RRC-, inactive state; and ii) receive, subsequent to detecting that the UE has transitioned from the inactive to an active state, a second notification from the RAN indicating that the UE is in an RRC-connected state. The AMF is further configured to receive the first notification from the RAN, the first notification comprising an indication regarding the RRC connection state of the UE.

In embodiments, the notification request is a UE State Transition Notification Request.

In embodiments, the reporting type indicator is an RRC-Connected state notification.

In embodiments, the AMF is further configured to perform the method according to any one of embodiments above.

DETAILED DESCRIPTION

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art. Additional information may also be found in the document(s) provided in the Appendix.

In some embodiments, notification procedures may be provided. For example, a new N2 notification may be provided as described below.

4.8.3 N2 Notification Procedure

This procedure may be used by an AMF to request the RAN to report RRC state information. In some embodiments, this procedure may be used when the target UE is in CM-CONNECTED state. This procedure can be used when the UE context is established towards the RAN, or after the UE context has been established. When AMF has requested reporting of subsequent state changes, the need for the RAN to continue reporting may cease when the UE transitions to CM-IDLE or the AMF sends a cancel indication. This procedure may be used for services that require RRC state information (e.g. 5GC MT control and paging assistance, O&M and collection of statistics), or for subscription to the service by other NFs.

Figure 1:
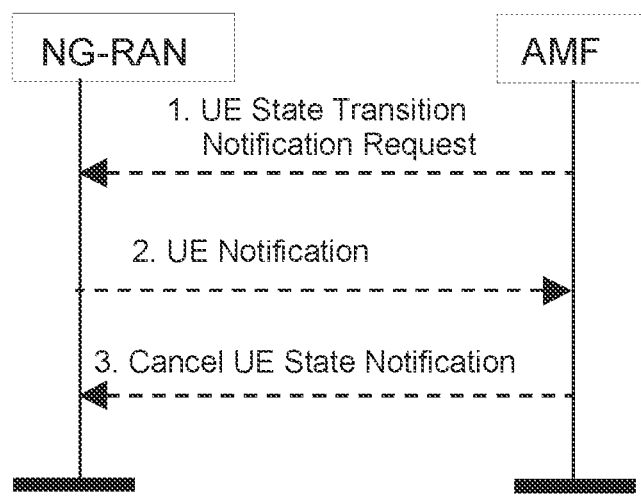
FIG. 1 illustrates a notification procedure.
Figure 2:
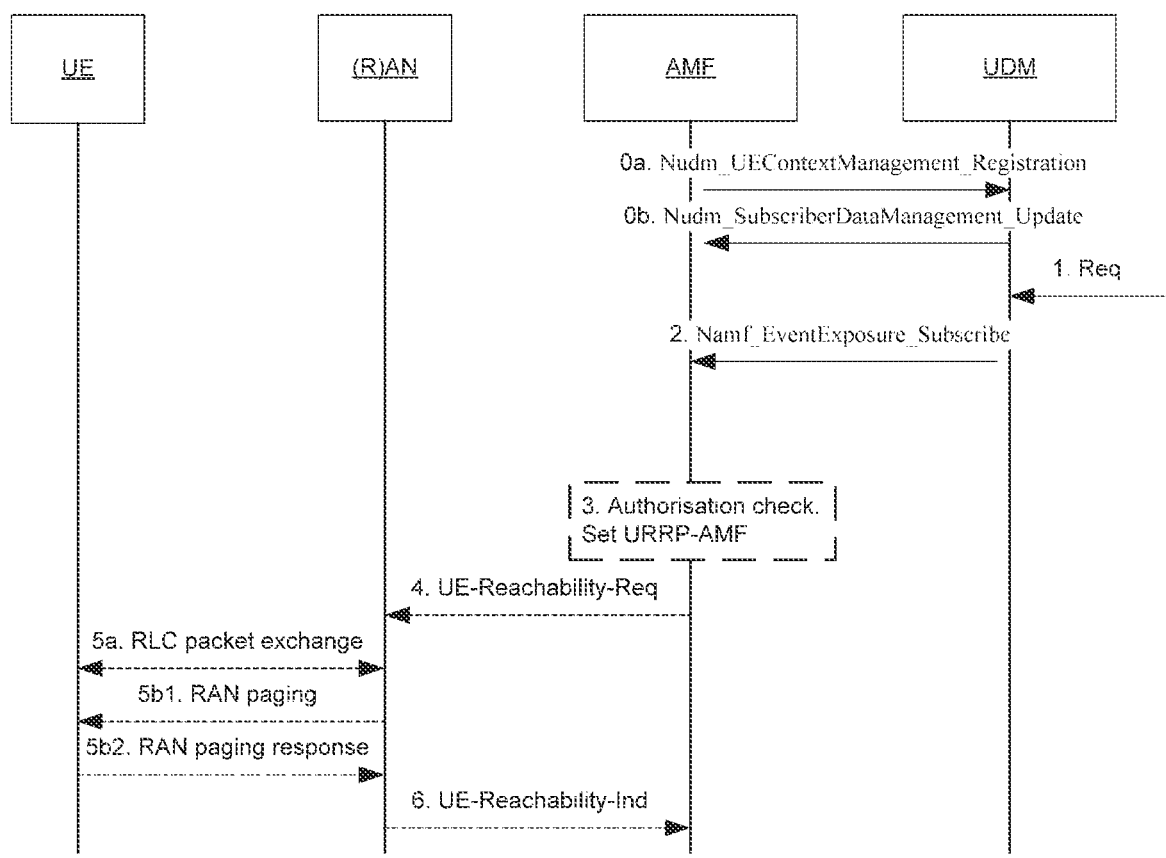
FIG. 2 illustrates a UE Reachability Notification Request procedure.
Figure 3:
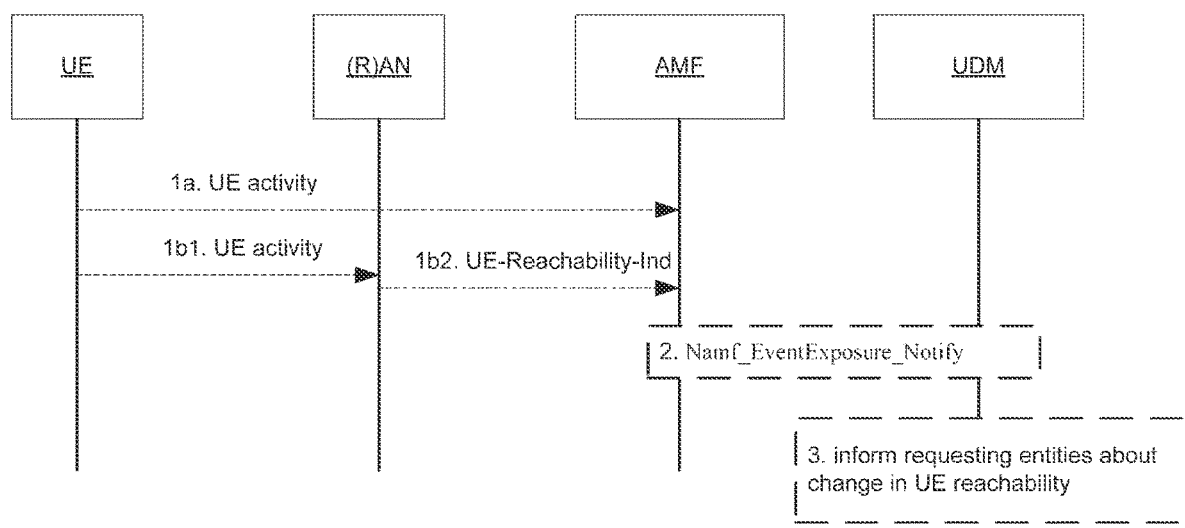
FIG. 3 illustrates a UE Activity Notification procedure.
Figure 4:
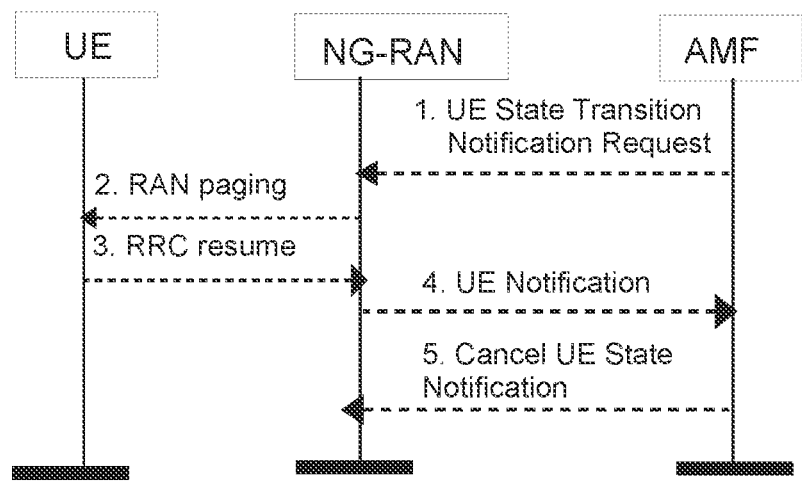
FIG. 4 illustrates a N2 notification procedure.

Reporting of RRC state transitions can be requested per UE by AMF. Continuous reporting of all RRC state transitions can be enabled by operator local configuration. With reference to FIG. 4, the N2 notification procedure may include the following steps:

1. The AMF sends a UE State Transition Notification Request message to the RAN. The UE State Transition Notification Request message shall identify the UE for which notification(s) are requested, and may contain a "Enable Reachability indicator" and a reporting type. The reporting type value (i.e., reporting type indicator) either indicates subsequent state transitions shall be notified at every RRC state transition, or it indicates RRC-Connected state notification. The "Enable Reachability indicator" is used to enable immediate UE reachability
2. If the UE state in the NG-RAN is RRC-Inactive state and the Enable Reachability indicator is set, the NG-RAN performs RAN paging.
3. If step 2 was preformed, the UE responds to paging with RRC resume, which moves the UE to RRC-Connected state.
4. The RAN sends the UE Notification message to report the current RRC state for the UE (i.e. RRC Inactive state or RRC Connected state). The current UE location information (i.e. TAI+Cell Identity) is always included when RRC state information is reported.
   When the AMF has requested reporting about subsequent state transitions, the RAN sends subsequent UE Notification messages to the AMF at every RRC state transition until the UE transitions to CM-IDLE or RAN receives a Cancel UE State Notification message from the AMF.
   When the AMF has requested RRC-Connected state notification and UE is in RRC-Connected state, the RAN sends no more subsequent UE notification message. If UE is in RRC-Inactive state, the RAN sends one more subsequent UE notification when RRC state transits to RRC-Connected.
5. The AMF can send a Cancel UE State Notification message to inform the RAN that it should terminate notifications for a given UE. This message should only be used when notification(s) about subsequent state transitions was requested at every RRC state transition.

Details concerning RRC and N2 messages and the information contained in these messages may be aligned with RAN WG2 and RAN WG3.

Figure 5:
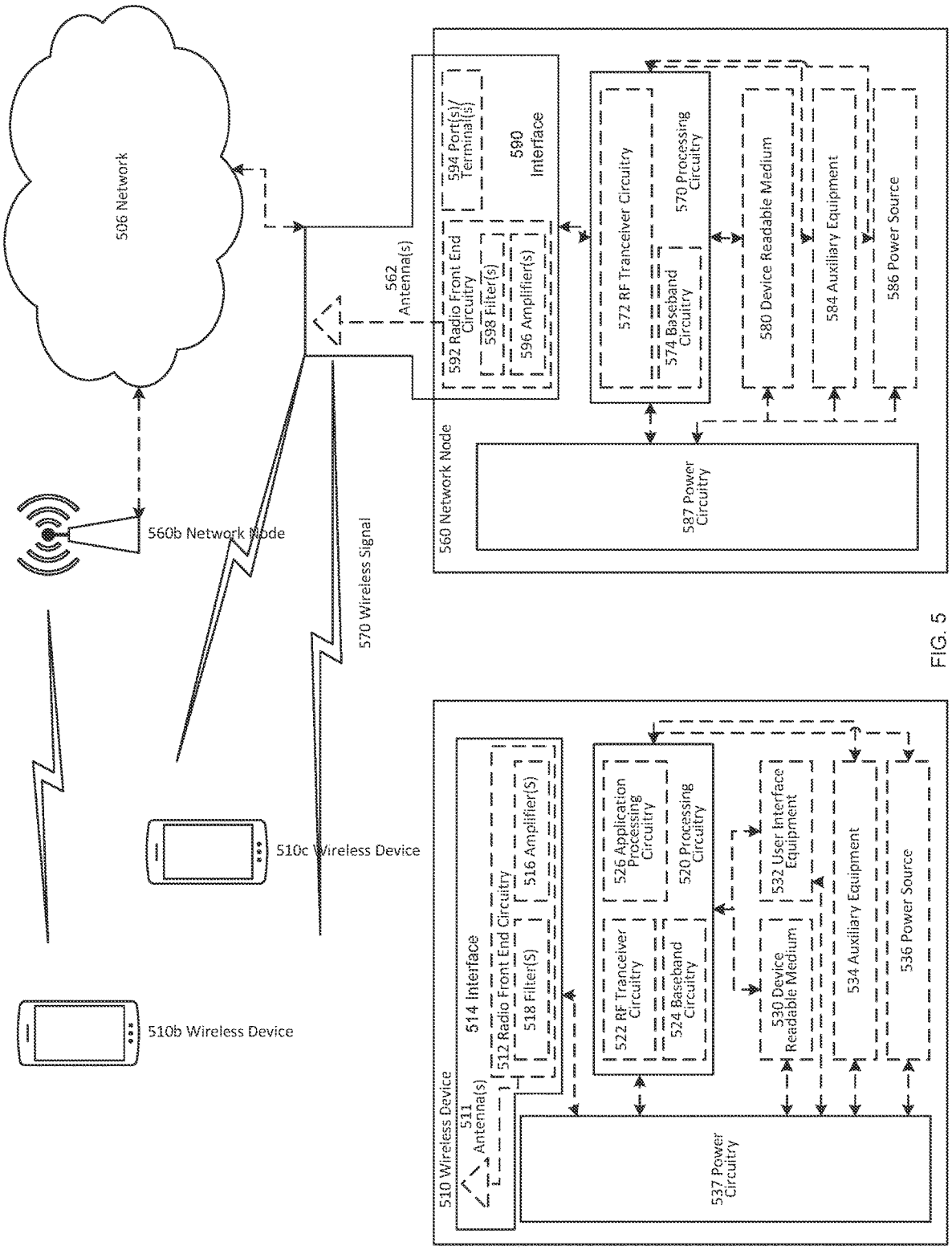
FIG. 5 illustrates an example wireless network.

Although the subject matter described herein may be implemented in any appropriate type of system using any suitable components, the embodiments disclosed herein are described in relation to a wireless network, such as the example wireless network illustrated in FIG. 5. For simplicity, the wireless network of FIG. 5 only depicts network 506, network nodes 560 and 560b, and WDs 510, 510b, and 510c. In practice, a wireless network may further include any additional elements suitable to support communication between wireless devices or between a wireless device and another communication device, such as a landline telephone, a service provider, or any other network node or end device. Of the illustrated components, network node 560 and wireless device (WD) 510 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 506 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 560 and WD 510 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 5, network node 560 includes processing circuitry 570, device readable medium 580, interface 590, auxiliary equipment 584, power source 586, power circuitry 587, and antenna 562. Although network node 560 illustrated in the example wireless network of FIG. 5 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 560 are depicted as single boxes located within a larger box, or nested within multiple boxes, in practice, a network node may comprise multiple different physical components that make up a single illustrated component (e.g., device readable medium 580 may comprise multiple separate hard drives as well as multiple RAM modules).

Similarly, network node 560 may be composed of multiple physically separate components (e.g., a NodeB component and a RNC component, or a BTS component and a BSC component, etc.), which may each have their own respective components. In certain scenarios in which network node 560 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 560 may be configured to support multiple radio access technologies (RATs). In such embodiments, some components may be duplicated (e.g., separate device readable medium 580 for the different RATs) and some components may be reused (e.g., the same antenna 562 may be shared by the RATs). Network node 560 may also include multiple sets of the various illustrated components for different wireless technologies integrated into network node 560, such as, for example, GSM, WCDMA, LTE, NR, WiFi, or Bluetooth wireless technologies. These wireless technologies may be integrated into the same or different chip or set of chips and other components within network node 560.

Processing circuitry 570 is configured to perform any determining, calculating, or similar operations (e.g., certain obtaining operations) described herein as being provided by a network node. These operations performed by processing circuitry 570 may include processing information obtained by processing circuitry 570 by, for example, converting the obtained information into other information, comparing the obtained information or converted information to information stored in the network node, and/or performing one or more operations based on the obtained information or converted information, and as a result of said processing making a determination.

Processing circuitry 570 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 560 components, such as device readable medium 580, network node 560 functionality. For example, processing circuitry 570 may execute instructions stored in device readable medium 580 or in memory within processing circuitry 570. Such functionality may include providing any of the various wireless features, functions, or benefits discussed herein. In some embodiments, processing circuitry 570 may include a system on a chip (SOC).

In some embodiments, processing circuitry 570 may include one or more of radio frequency (RF) transceiver circuitry 572 and baseband processing circuitry 574. In some embodiments, radio frequency (RF) transceiver circuitry 572 and baseband processing circuitry 574 may be on separate chips (or sets of chips), boards, or units, such as radio units and digital units. In alternative embodiments, part or all of RF transceiver circuitry 572 and baseband processing circuitry 574 may be on the same chip or set of chips, boards, or units In certain embodiments, some or all of the functionality described herein as being provided by a network node, base station, eNB or other such network device may be performed by processing circuitry 570 executing instructions stored on device readable medium 580 or memory within processing circuitry 570. In alternative embodiments, some or all of the functionality may be provided by processing circuitry 570 without executing instructions stored on a separate or discrete device readable medium, such as in a hard-wired manner. In any of those embodiments, whether executing instructions stored on a device readable storage medium or not, processing circuitry 570 can be configured to perform the described functionality. The benefits provided by such functionality are not limited to processing circuitry 570 alone or to other components of network node 560, but are enjoyed by network node 560 as a whole, and/or by end users and the wireless network generally.

Device readable medium 580 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 570. Device readable medium 580 may store any suitable instructions, data or information, including a computer program, software, an application including one or more of logic, rules, code, tables, etc. and/or other instructions capable of being executed by processing circuitry 570 and, utilized by network node 560. Device readable medium 580 may be used to store any calculations made by processing circuitry 570 and/or any data received via interface 590. In some embodiments, processing circuitry 570 and device readable medium 580 may be considered to be integrated.

Interface 590 is used in the wired or wireless communication of signalling and/or data between network node 560, network 506, and/or WDs 510. As illustrated, interface 590 comprises port(s)/terminal(s) 594 to send and receive data, for example to and from network 506 over a wired connection. Interface 590 also includes radio front end circuitry 592 that may be coupled to, or in certain embodiments a part of, antenna 562. Radio front end circuitry 592 comprises filters 598 and amplifiers 596. Radio front end circuitry 592 may be connected to antenna 562 and processing circuitry 570. Radio front end circuitry may be configured to condition signals communicated between antenna 562 and processing circuitry 570. Radio front end circuitry 592 may receive digital data that is to be sent out to other network nodes or WDs via a wireless connection. Radio front end circuitry 592 may convert the digital data into a radio signal having the appropriate channel and bandwidth parameters using a combination of filters 598 and/or amplifiers 596. The radio signal may then be transmitted via antenna 562. Similarly, when receiving data, antenna 562 may collect radio signals which are then converted into digital data by radio front end circuitry 592. The digital data may be passed to processing circuitry 570. In other embodiments, the interface may comprise different components and/or different combinations of components.

In certain alternative embodiments, network node 560 may not include separate radio front end circuitry 592, instead, processing circuitry 570 may comprise radio front end circuitry and may be connected to antenna 562 without separate radio front end circuitry 592. Similarly, in some embodiments, all or some of RF transceiver circuitry 572 may be considered a part of interface 590. In still other embodiments, interface 590 may include one or more ports or terminals 594, radio front end circuitry 592, and RF transceiver circuitry 572, as part of a radio unit (not shown), and interface 590 may communicate with baseband processing circuitry 574, which is part of a digital unit (not shown).

Antenna 562 may include one or more antennas, or antenna arrays, configured to send and/or receive wireless signals. Antenna 562 may be coupled to radio front end circuitry 590 and may be any type of antenna capable of transmitting and receiving data and/or signals wirelessly. In some embodiments, antenna 562 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 562 may be separate from network node 560 and may be connectable to network node 560 through an interface or port.

Antenna 562, interface 590, and/or processing circuitry 570 may be configured to perform any receiving operations and/or certain obtaining operations described herein as being performed by a network node. Any information, data and/or signals may be received from a wireless device, another network node and/or any other network equipment. Similarly, antenna 562, interface 590, and/or processing circuitry 570 may be configured to perform any transmitting operations described herein as being performed by a network node. Any information, data and/or signals may be transmitted to a wireless device, another network node and/or any other network equipment.

Power circuitry 587 may comprise, or be coupled to, power management circuitry and is configured to supply the components of network node 560 with power for performing the functionality described herein. Power circuitry 587 may receive power from power source 586. Power source 586 and/or power circuitry 587 may be configured to provide power to the various components of network node 560 in a form suitable for the respective components (e.g., at a voltage and current level needed for each respective component). Power source 586 may either be included in, or external to, power circuitry 587 and/or network node 560. For example, network node 560 may be connectable to an external power source (e.g., an electricity outlet) via an input circuitry or interface such as an electrical cable, whereby the external power source supplies power to power circuitry 587. As a further example, power source 586 may comprise a source of power in the form of a battery or battery pack which is connected to, or integrated in, power circuitry 587. The battery may provide backup power should the external power source fail. Other types of power sources, such as photovoltaic devices, may also be used.

Alternative embodiments of network node 560 may include additional components beyond those shown in FIG. 5 that may be responsible for providing certain aspects of the network node's functionality, including any of the functionality described herein and/or any functionality necessary to support the subject matter described herein. For example, network node 560 may include user interface equipment to allow input of information into network node 560 and to allow output of information from network node 560. This may allow a user to perform diagnostic, maintenance, repair, and other administrative functions for network node 560.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 510 includes antenna 511, interface 514, processing circuitry 520, device readable medium 530, user interface equipment 532, auxiliary equipment 534, power source 536 and power circuitry 537. WD 510 may include multiple sets of one or more of the illustrated components for different wireless technologies supported by WD 510, such as, for example, GSM, WCDMA, LTE, NR, WiFi, WiMAX, or Bluetooth wireless technologies, just to mention a few. These wireless technologies may be integrated into the same or different chips or set of chips as other components within WD 510.

Antenna 511 may include one or more antennas or antenna arrays, configured to send and/or receive wireless signals, and is connected to interface 514. In certain alternative embodiments, antenna 511 may be separate from WD 510 and be connectable to WD 510 through an interface or port. Antenna 511, interface 514, and/or processing circuitry 520 may be configured to perform any receiving or transmitting operations described herein as being performed by a WD. Any information, data and/or signals may be received from a network node and/or another WD. In some embodiments, radio front end circuitry and/or antenna 511 may be considered an interface.

As illustrated, interface 514 comprises radio front end circuitry 512 and antenna 511. Radio front end circuitry 512 comprise one or more filters 518 and amplifiers 516. Radio front end circuitry 514 is connected to antenna 511 and processing circuitry 520, and is configured to condition signals communicated between antenna 511 and processing circuitry 520. Radio front end circuitry 512 may be coupled to or a part of antenna 511. In some embodiments, WD 510 may not include separate radio front end circuitry 512; rather, processing circuitry 520 may comprise radio front end circuitry and may be connected to antenna 511. Similarly, in some embodiments, some or all of RF transceiver circuitry 522 may be considered a part of interface 514. Radio front end circuitry 512 may receive digital data that is to be sent out to other network nodes or WDs via a wireless connection. Radio front end circuitry 512 may convert the digital data into a radio signal having the appropriate channel and bandwidth parameters using a combination of filters 518 and/or amplifiers 516. The radio signal may then be transmitted via antenna 511. Similarly, when receiving data, antenna 511 may collect radio signals which are then converted into digital data by radio front end circuitry 512. The digital data may be passed to processing circuitry 520. In other embodiments, the interface may comprise different components and/or different combinations of components.

Processing circuitry 520 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 510 components, such as device readable medium 530, WD 510 functionality. Such functionality may include providing any of the various wireless features or benefits discussed herein. For example, processing circuitry 520 may execute instructions stored in device readable medium 530 or in memory within processing circuitry 520 to provide the functionality disclosed herein.

As illustrated, processing circuitry 520 includes one or more of RF transceiver circuitry 522, baseband processing circuitry 524, and application processing circuitry 526. In other embodiments, the processing circuitry may comprise different components and/or different combinations of components. In certain embodiments processing circuitry 520 of WD 510 may comprise a SOC. In some embodiments, RF transceiver circuitry 522, baseband processing circuitry 524, and application processing circuitry 526 may be on separate chips or sets of chips. In alternative embodiments, part or all of baseband processing circuitry 524 and application processing circuitry 526 may be combined into one chip or set of chips, and RF transceiver circuitry 522 may be on a separate chip or set of chips. In still alternative embodiments, part or all of RF transceiver circuitry 522 and baseband processing circuitry 524 may be on the same chip or set of chips, and application processing circuitry 526 may be on a separate chip or set of chips. In yet other alternative embodiments, part or all of RF transceiver circuitry 522, baseband processing circuitry 524, and application processing circuitry 526 may be combined in the same chip or set of chips. In some embodiments, RF transceiver circuitry 522 may be a part of interface 514. RF transceiver circuitry 522 may condition RF signals for processing circuitry 520.

In certain embodiments, some or all of the functionality described herein as being performed by a WD may be provided by processing circuitry 520 executing instructions stored on device readable medium 530, which in certain embodiments may be a computer-readable storage medium. In alternative embodiments, some or all of the functionality may be provided by processing circuitry 520 without executing instructions stored on a separate or discrete device readable storage medium, such as in a hard-wired manner. In any of those particular embodiments, whether executing instructions stored on a device readable storage medium or not, processing circuitry 520 can be configured to perform the described functionality. The benefits provided by such functionality are not limited to processing circuitry 520 alone or to other components of WD 510, but are enjoyed by WD 510 as a whole, and/or by end users and the wireless network generally.

Processing circuitry 520 may be configured to perform any determining, calculating, or similar operations (e.g., certain obtaining operations) described herein as being performed by a WD. These operations, as performed by processing circuitry 520, may include processing information obtained by processing circuitry 520 by, for example, converting the obtained information into other information, comparing the obtained information or converted information to information stored by WD 510, and/or performing one or more operations based on the obtained information or converted information, and as a result of said processing making a determination.

Device readable medium 530 may be operable to store a computer program, software, an application including one or more of logic, rules, code, tables, etc. and/or other instructions capable of being executed by processing circuitry 520. Device readable medium 530 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 520. In some embodiments, processing circuitry 520 and device readable medium 530 may be considered to be integrated.

User interface equipment 532 may provide components that allow for a human user to interact with WD 510. Such interaction may be of many forms, such as visual, audial, tactile, etc. User interface equipment 532 may be operable to produce output to the user and to allow the user to provide input to WD 510. The type of interaction may vary depending on the type of user interface equipment 532 installed in WD 510. For example, if WD 510 is a smart phone, the interaction may be via a touch screen; if WD 510 is a smart meter, the interaction may be through a screen that provides usage (e.g., the number of gallons used) or a speaker that provides an audible alert (e.g., if smoke is detected). User interface equipment 532 may include input interfaces, devices and circuits, and output interfaces, devices and circuits. User interface equipment 532 is configured to allow input of information into WD 510, and is connected to processing circuitry 520 to allow processing circuitry 520 to process the input information. User interface equipment 532 may include, for example, a microphone, a proximity or other sensor, keys/buttons, a touch display, one or more cameras, a USB port, or other input circuitry. User interface equipment 532 is also configured to allow output of information from WD 510, and to allow processing circuitry 520 to output information from WD 510. User interface equipment 532 may include, for example, a speaker, a display, vibrating circuitry, a USB port, a headphone interface, or other output circuitry. Using one or more input and output interfaces, devices, and circuits, of user interface equipment 532, WD 510 may communicate with end users and/or the wireless network, and allow them to benefit from the functionality described herein.

Auxiliary equipment 534 is operable to provide more specific functionality which may not be generally performed by WDs. This may comprise specialized sensors for doing measurements for various purposes, interfaces for additional types of communication such as wired communications etc. The inclusion and type of components of auxiliary equipment 534 may vary depending on the embodiment and/or scenario.

Power source 536 may, in some embodiments, be in the form of a battery or battery pack. Other types of power sources, such as an external power source (e.g., an electricity outlet), photovoltaic devices or power cells, may also be used. WD 510 may further comprise power circuitry 537 for delivering power from power source 536 to the various parts of WD 510 which need power from power source 536 to carry out any functionality described or indicated herein. Power circuitry 537 may in certain embodiments comprise power management circuitry. Power circuitry 537 may additionally or alternatively be operable to receive power from an external power source; in which case WD 510 may be connectable to the external power source (such as an electricity outlet) via input circuitry or an interface such as an electrical power cable. Power circuitry 537 may also in certain embodiments be operable to deliver power from an external power source to power source 536. This may be, for example, for the charging of power source 536. Power circuitry 537 may perform any formatting, converting, or other modification to the power from power source 536 to make the power suitable for the respective components of WD 510 to which power is supplied.

Figure 6:
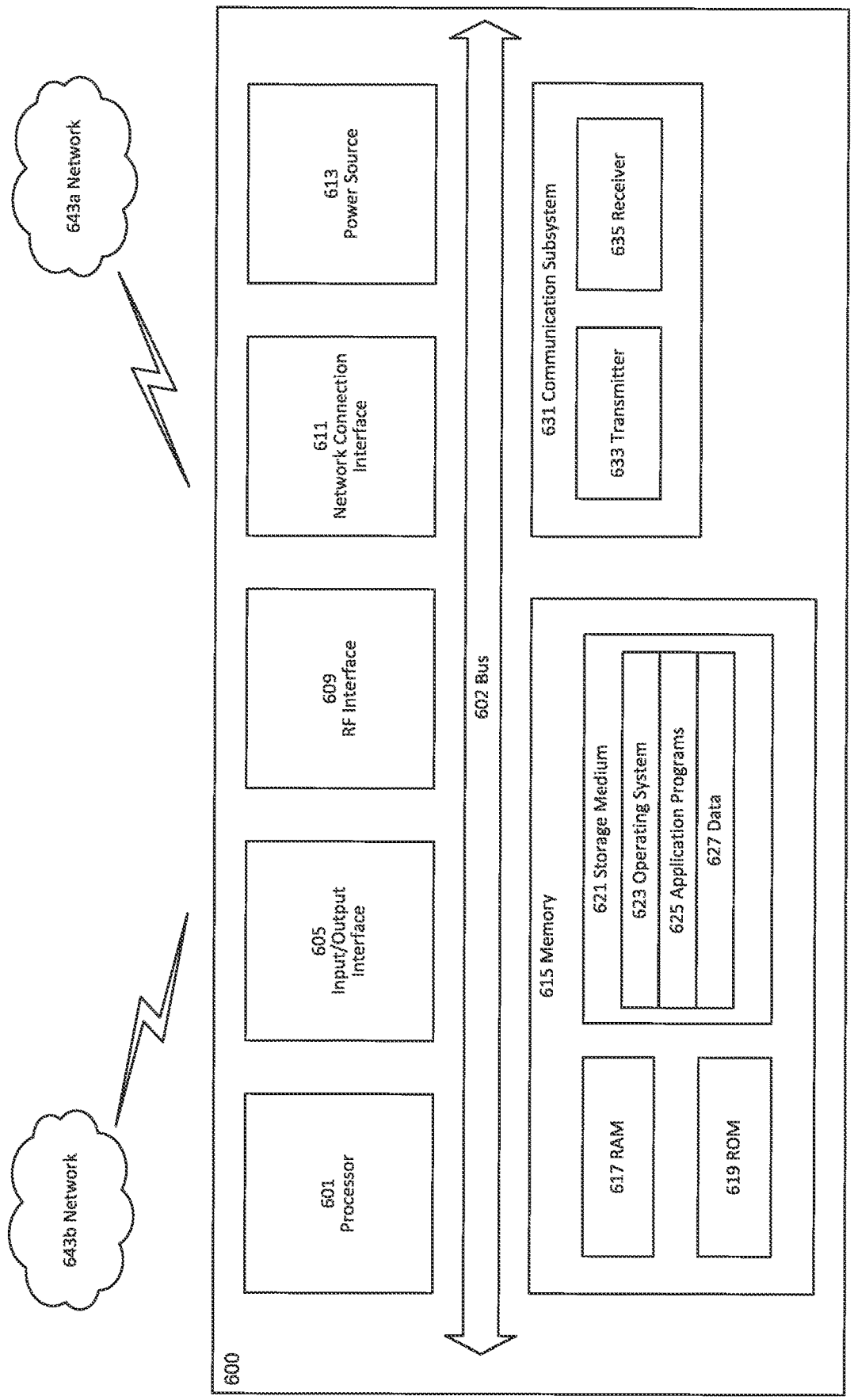
FIG. 6 illustrates one embodiment of a UE.

FIG. 6 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 6200 may be any UE identified by the 3rd Generation Partnership Project (3GPP), including a NB-IoT UE, a machine type communication (MTC) UE, and/or an enhanced MTC (eMTC) UE. UE 600, as illustrated in FIG. 6, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 6 is a UE, the components discussed herein are equally applicable to a WD, and vice-versa.

In FIG. 6, UE 600 includes processing circuitry 601 that is operatively coupled to input/output interface 605, radio frequency (RF) interface 609, network connection interface 611, memory 615 including random access memory (RAM) 617, read-only memory (ROM) 619, and storage medium 621 or the like, communication subsystem 631, power source 633, and/or any other component, or any combination thereof. Storage medium 621 includes operating system 623, application program 625, and data 627. In other embodiments, storage medium 621 may include other similar types of information. Certain UEs may utilize all of the components shown in FIG. 6, or only a subset of the components. The level of integration between the components may vary from one UE to another UE. Further, certain UEs may contain multiple instances of a component, such as multiple processors, memories, transceivers, transmitters, receivers, etc.

In FIG. 6, processing circuitry 601 may be configured to process computer instructions and data. Processing circuitry 601 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 601 may include two central processing units (CPUs). Data may be information in a form suitable for use by a computer.

In the depicted embodiment, input/output interface 605 may be configured to provide a communication interface to an input device, output device, or input and output device. UE 600 may be configured to use an output device via input/output interface 605. An output device may use the same type of interface port as an input device. For example, a USB port may be used to provide input to and output from UE 600. The output device may be a speaker, a sound card, a video card, a display, a monitor, a printer, an actuator, an emitter, a smartcard, another output device, or any combination thereof. UE 600 may be configured to use an input device via input/output interface 605 to allow a user to capture information into UE 600. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 6, RF interface 609 may be configured to provide a communication interface to RF components such as a transmitter, a receiver, and an antenna. Network connection interface 611 may be configured to provide a communication interface to network 643a. Network 643a may encompass wired and/or wireless networks such as a local-area network (LAN), a wide-area network (WAN), a computer network, a wireless network, a telecommunications network, another like network or any combination thereof. For example, network 643a may comprise a Wi-Fi network. Network connection interface 611 may be configured to include a receiver and a transmitter interface used to communicate with one or more other devices over a communication network according to one or more communication protocols, such as Ethernet, TCP/IP, SONET, ATM, or the like. Network connection interface 611 may implement receiver and transmitter functionality appropriate to the communication network links (e.g., optical, electrical, and the like). The transmitter and receiver functions may share circuit components, software or firmware, or alternatively may be implemented separately.

RAM 617 may be configured to interface via bus 602 to processing circuitry 601 to provide storage or caching of data or computer instructions during the execution of software programs such as the operating system, application programs, and device drivers. ROM 619 may be configured to provide computer instructions or data to processing circuitry 601. For example, ROM 619 may be configured to store invariant low-level system code or data for basic system functions such as basic input and output (I/O), startup, or reception of keystrokes from a keyboard that are stored in a non-volatile memory. Storage medium 621 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 621 may be configured to include operating system 623, application program 625 such as a web browser application, a widget or gadget engine or another application, and data file 627. Storage medium 621 may store, for use by UE 600, any of a variety of various operating systems or combinations of operating systems.

Storage medium 621 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 621 may allow UE 600 to access computer-executable instructions, application programs or the like, stored on transitory or non-transitory memory media, to off-load data, or to upload data. An article of manufacture, such as one utilizing a communication system may be tangibly embodied in storage medium 621, which may comprise a device readable medium.

In FIG. 6, processing circuitry 601 may be configured to communicate with network 643b using communication subsystem 631. Network 643a and network 643b may be the same network or networks or different network or networks. Communication subsystem 631 may be configured to include one or more transceivers used to communicate with network 643b. For example, communication subsystem 631 may be configured to include one or more transceivers used to communicate with one or more remote transceivers of another device capable of wireless communication such as another WD, UE, or base station of a radio access network (RAN) according to one or more communication protocols, such as IEEE 802.QQ2, CDMA, WCDMA, GSM, LTE, UTRAN, WiMax, or the like. Each transceiver may include transmitter 633 and/or receiver 635 to implement transmitter or receiver functionality, respectively, appropriate to the RAN links (e.g., frequency allocations and the like). Further, transmitter 633 and receiver 635 of each transceiver may share circuit components, software or firmware, or alternatively may be implemented separately.

In the illustrated embodiment, the communication functions of communication subsystem 631 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 631 may include cellular communication, Wi-Fi communication, Bluetooth communication, and GPS communication. Network 643b may encompass wired and/or wireless networks such as a local-area network (LAN), a wide-area network (WAN), a computer network, a wireless network, a telecommunications network, another like network or any combination thereof. For example, network 643b may be a cellular network, a Wi-Fi network, and/or a near-field network. Power source 613 may be configured to provide alternating current (AC) or direct current (DC) power to components of UE 600.

The features, benefits and/or functions described herein may be implemented in one of the components of UE 600 or partitioned across multiple components of UE 600. Further, the features, benefits, and/or functions described herein may be implemented in any combination of hardware, software or firmware. In one example, communication subsystem 631 may be configured to include any of the components described herein. Further, processing circuitry 601 may be configured to communicate with any of such components over bus 602. In another example, any of such components may be represented by program instructions stored in memory that when executed by processing circuitry 601 perform the corresponding functions described herein. In another example, the functionality of any of such components may be partitioned between processing circuitry 601 and communication subsystem 631. In another example, the non-computationally intensive functions of any of such components may be implemented in software or firmware and the computationally intensive functions may be implemented in hardware.

Figure 7:
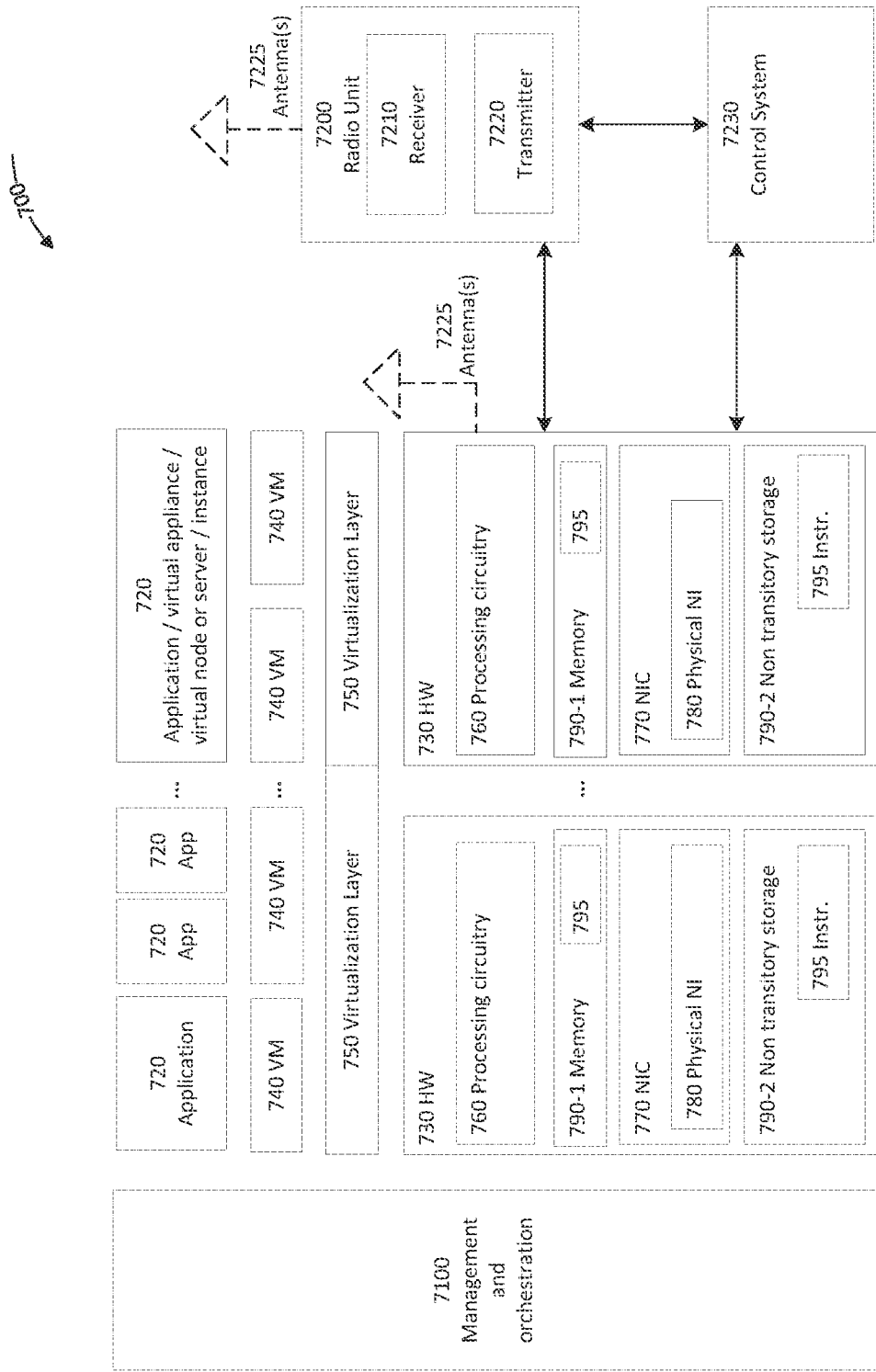
FIG. 7 is a schematic block diagram illustrating a virtualization environment.

FIG. 7 is a schematic block diagram illustrating a virtualization environment 700 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 700 hosted by one or more of hardware nodes 730. Further, in embodiments in which the virtual node is not a radio access node or does not require radio connectivity (e.g., a core network node), then the network node may be entirely virtualized.

The functions may be implemented by one or more applications 720 (which may alternatively be called software instances, virtual appliances, network functions, virtual nodes, virtual network functions, etc.) operative to implement some of the features, functions, and/or benefits of some of the embodiments disclosed herein. Applications 720 are run in virtualization environment 700 which provides hardware 730 comprising processing circuitry 760 and memory 790. Memory 790 contains instructions 795 executable by processing circuitry 760 whereby application 720 is operative to provide one or more of the features, benefits, and/or functions disclosed herein.

Virtualization environment 700, comprises general-purpose or special-purpose network hardware devices 730 comprising a set of one or more processors or processing circuitry 760, which may be commercial off-the-shelf (COTS) processors, dedicated Application Specific Integrated Circuits (ASICs), or any other type of processing circuitry including digital or analog hardware components or special purpose processors. Each hardware device may comprise memory 790-1 which may be non-persistent memory for temporarily storing instructions 795 or software executed by processing circuitry 760. Each hardware device may comprise one or more network interface controllers (NICs) 770, also known as network interface cards, which include physical network interface 780. Each hardware device may also include non-transitory, persistent, machine-readable storage media 790-2 having stored therein software 795 and/or instructions executable by processing circuitry 760. Software 795 may include any type of software including software for instantiating one or more virtualization layers 750 (also referred to as hypervisors), software to execute virtual machines 740 as well as software allowing it to execute functions, features and/or benefits described in relation with some embodiments described herein.

Virtual machines 740, comprise virtual processing, virtual memory, virtual networking or interface and virtual storage, and may be run by a corresponding virtualization layer 750 or hypervisor. Different embodiments of the instance of virtual appliance 720 may be implemented on one or more of virtual machines 740, and the implementations may be made in different ways.

During operation, processing circuitry 760 executes software 795 to instantiate the hypervisor or virtualization layer 750, which may sometimes be referred to as a virtual machine monitor (VMM). Virtualization layer 750 may present a virtual operating platform that appears like networking hardware to virtual machine 740.

As shown in FIG. 7, hardware 730 may be a standalone network node with generic or specific components. Hardware 730 may comprise antenna 7225 and may implement some functions via virtualization. Alternatively, hardware 730 may be part of a larger cluster of hardware (e.g. such as in a data center or customer premise equipment (CPE)) where many hardware nodes work together and are managed via management and orchestration (MANO) 7100, which, among others, oversees lifecycle management of applications 720.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 740 may be a software implementation of a physical machine that runs programs as if they were executing on a physical, non-virtualized machine. Each of virtual machines 740, and that part of hardware 730 that executes that virtual machine, be it hardware dedicated to that virtual machine and/or hardware shared by that virtual machine with others of the virtual machines 740, forms a separate virtual network elements (VNE).

Still in the context of NFV, Virtual Network Function (VNF) is responsible for handling specific network functions that run in one or more virtual machines 740 on top of hardware networking infrastructure 730 and corresponds to application 720 in FIG. 7.

In some embodiments, one or more radio units 7200 that each include one or more transmitters 7220 and one or more receivers 7210 may be coupled to one or more antennas 7225. Radio units 7200 may communicate directly with hardware nodes 7330 via one or more appropriate network interfaces and may be used in combination with the virtual components to provide a virtual node with radio capabilities, such as a radio access node or a base station.

In some embodiments, some signalling can be effected with the use of control system 7230 which may alternatively be used for communication between the hardware nodes 730 and radio units 7200.

Figure 8:
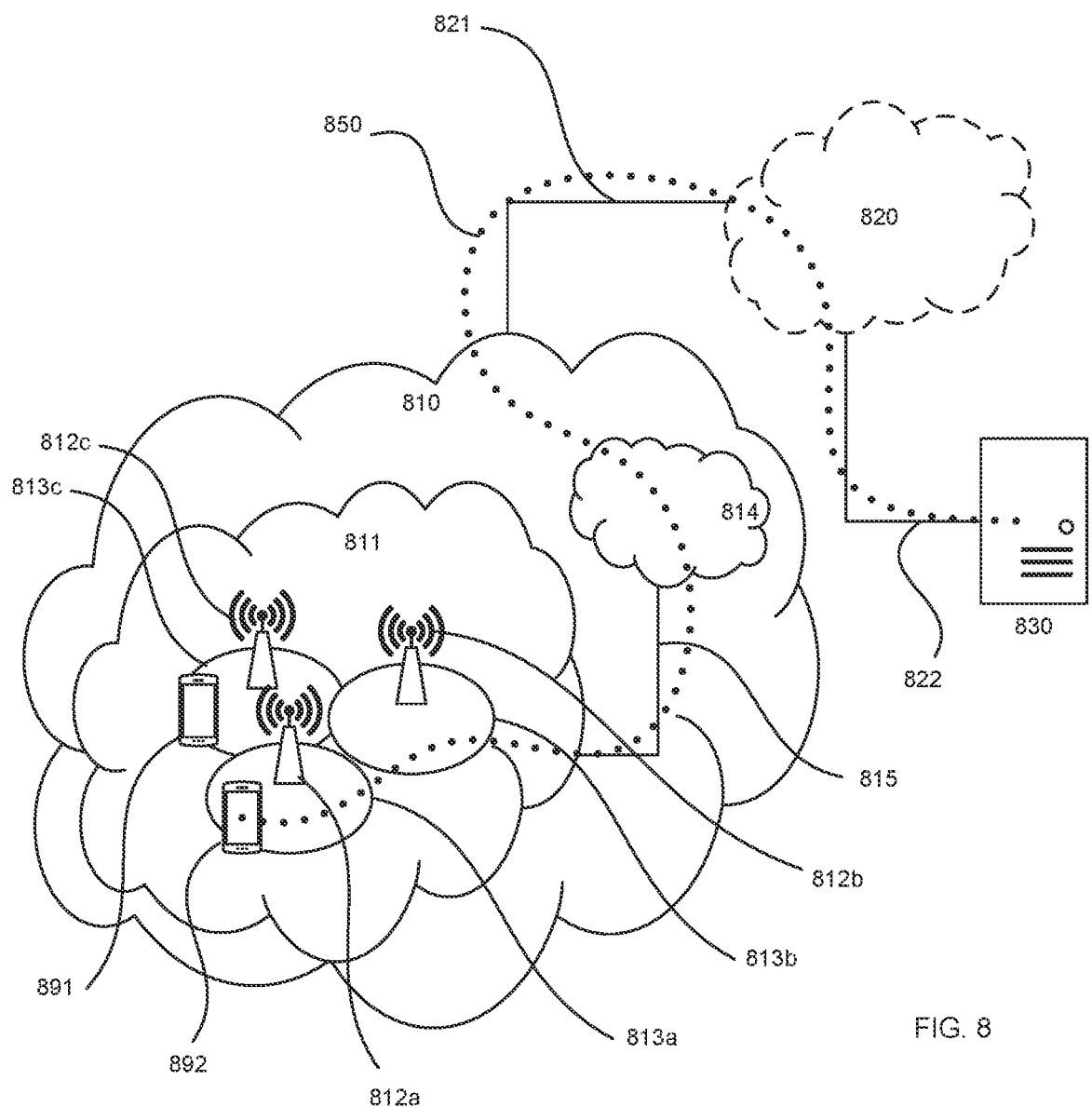
FIG. 8 illustrates a communication system in accordance with an embodiment.

With reference to FIG. 8, a communication system in accordance with an embodiment is shown. The illustrated communication system includes telecommunication network 810, such as a 3GPP-type cellular network, which comprises access network 811, such as a radio access network, and core network 814. Access network 811 comprises a plurality of base stations 812a, 812b, 812c, such as NBs, eNBs, gNBs or other types of wireless access points, each defining a corresponding coverage area 813a, 813b, 813c. Each base station 812a, 812b, 812c is connectable to core network 814 over a wired or wireless connection 815. A first UE 891 located in coverage area 813c is configured to wirelessly connect to, or be paged by, the corresponding base station 812c. A second UE 892 in coverage area 813a is wirelessly connectable to the corresponding base station 812a. While a plurality of UEs 891, 892 are illustrated in this example, the disclosed embodiments are equally applicable to a situation where a sole UE is in the coverage area or where a sole UE is connecting to the corresponding base station 812.

Telecommunication network 810 is itself connected to host computer 830, which may be embodied in the hardware and/or software of a standalone server, a cloud-implemented server, a distributed server or as processing resources in a server farm. Host computer 830 may be under the ownership or control of a service provider, or may be operated by the service provider or on behalf of the service provider. Connections 821 and 822 between telecommunication network 810 and host computer 830 may extend directly from core network 814 to host computer 830 or may go via an optional intermediate network 820. Intermediate network 820 may be one of, or a combination of more than one of, a public, private or hosted network; intermediate network 820, if any, may be a backbone network or the Internet; in particular, intermediate network 820 may comprise two or more sub-networks (not shown).

The communication system of FIG. 8 as a whole enables connectivity between the connected UEs 891, 892 and host computer 830. The connectivity may be described as an over-the-top (OTT) connection 850. Host computer 830 and the connected UEs 891, 892 are configured to communicate data and/or signaling via OTT connection 850, using access network 811, core network 814, any intermediate network 820 and possible further infrastructure (not shown) as intermediaries. OTT connection 850 may be transparent in the sense that the participating communication devices through which OTT connection 850 passes are unaware of routing of uplink and downlink communications. For example, base station 812 may not or need not be informed about the past routing of an incoming downlink communication with data originating from host computer 830 to be forwarded (e.g., handed over) to a connected UE 891. Similarly, base station 812 need not be aware of the future routing of an outgoing uplink communication originating from the UE 891 towards the host computer 830.

Example implementations, in accordance with an embodiment, of the UE, base station and host computer discussed in the preceding paragraphs will now be described with reference to FIG. 5. In communication system 900, host computer 910 comprises hardware 915 including communication interface 916 configured to set up and maintain a wired or wireless connection with an interface of a different communication device of communication system 900. Host computer 910 further comprises processing circuitry 918, which may have storage and/or processing capabilities. In particular, processing circuitry 918 may comprise one or more programmable processors, application-specific integrated circuits, field programmable gate arrays or combinations of these (not shown) adapted to execute instructions. Host computer 910 further comprises software 911, which is stored in or accessible by host computer 910 and executable by processing circuitry 918. Software 911 includes host application 912. Host application 912 may be operable to provide a service to a remote user, such as UE 930 connecting via OTT connection 950 terminating at UE 930 and host computer 910. In providing the service to the remote user, host application 912 may provide user data which is transmitted using OTT connection 950.

Communication system 900 further includes base station 920 provided in a telecommunication system and comprising hardware 925 enabling it to communicate with host computer 910 and with UE 930. Hardware 925 may include communication interface 926 for setting up and maintaining a wired or wireless connection with an interface of a different communication device of communication system 900, as well as radio interface 927 for setting up and maintaining at least wireless connection 970 with UE 930 located in a coverage area (not shown in FIG. 5) served by base station 920. Communication interface 926 may be configured to facilitate connection 960 to host computer 910. Connection 960 may be direct or it may pass through a core network (not shown in FIG. 9) of the telecommunication system and/or through one or more intermediate networks outside the telecommunication system. In the embodiment shown, hardware 925 of base station 920 further includes processing circuitry 928, which may comprise one or more programmable processors, application-specific integrated circuits, field programmable gate arrays or combinations of these (not shown) adapted to execute instructions. Base station 920 further has software 921 stored internally or accessible via an external connection.

Communication system 900 further includes UE 930 already referred to Its hardware 935 may include radio interface 937 configured to set up and maintain wireless connection 970 with a base station serving a coverage area in which UE 930 is currently located. Hardware 935 of UE 930 further includes processing circuitry 938, which may comprise one or more programmable processors, application-specific integrated circuits, field programmable gate arrays or combinations of these (not shown) adapted to execute instructions. UE 930 further comprises software 931, which is stored in or accessible by UE 930 and executable by processing circuitry 938. Software 931 includes client application 932. Client application 932 may be operable to provide a service to a human or non-human user via UE 930, with the support of host computer 910. In host computer 910, an executing host application 912 may communicate with the executing client application 932 via OTT connection 950 terminating at UE 930 and host computer 910. In providing the service to the user, client application 932 may receive request data from host application 912 and provide user data in response to the request data. OTT connection 950 may transfer both the request data and the user data. Client application 932 may interact with the user to generate the user data that it provides.

Figure 9:
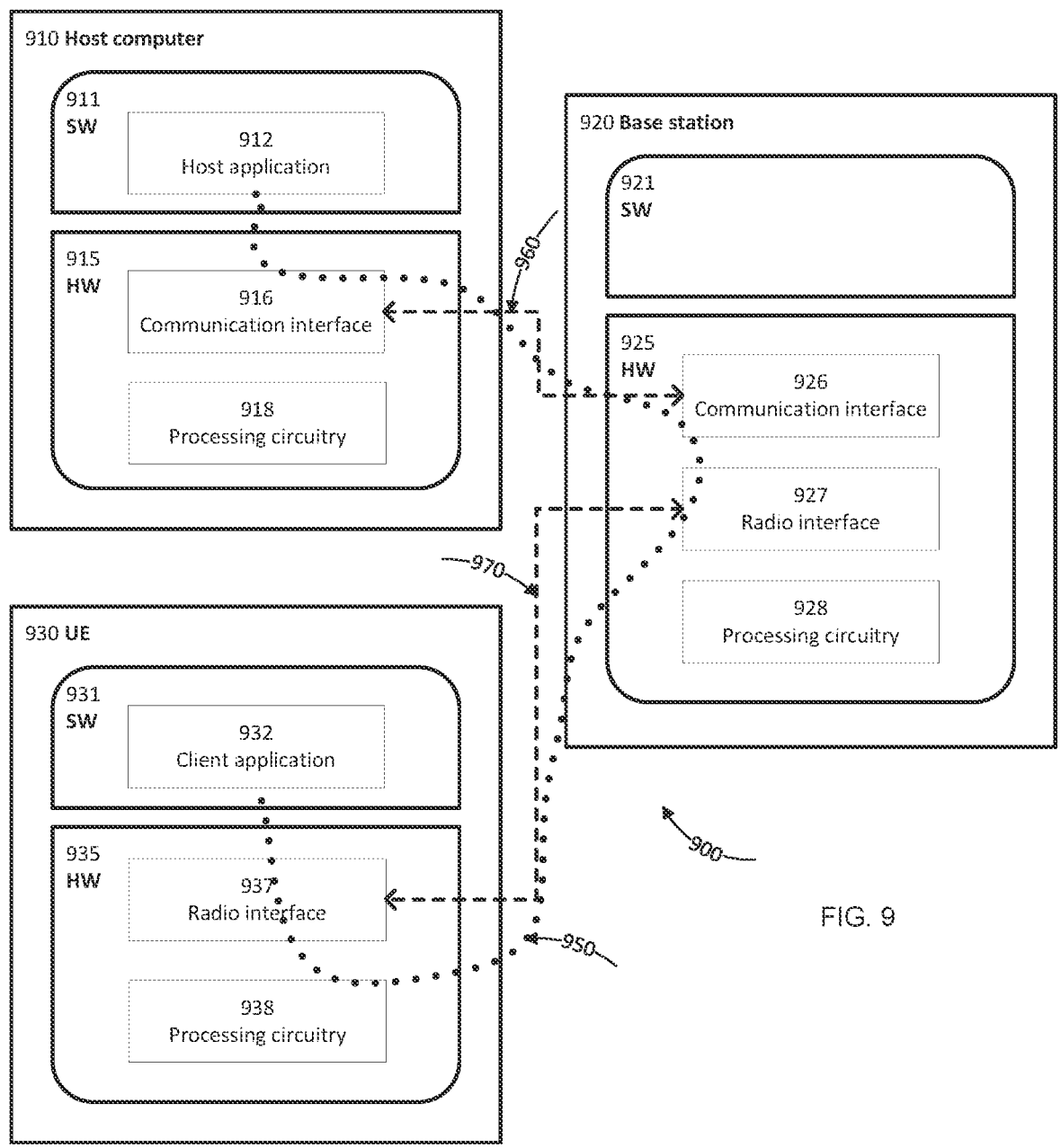
FIG. 9 illustrates a communication system.

It is noted that host computer 910, base station 920 and UE 930 illustrated in FIG. 9 may be similar or identical to host computer 830, one of base stations 812a, 812b, 812c and one of UEs 891, 892 of FIG. 8, respectively. This is to say, the inner workings of these entities may be as shown in FIG. 9 and independently, the surrounding network topology may be that of FIG. 8.

In FIG. 9, OTT connection 950 has been drawn abstractly to illustrate the communication between host computer 910 and UE 930 via base station 920, without explicit reference to any intermediary devices and the precise routing of messages via these devices. Network infrastructure may determine the routing, which it may be configured to hide from UE 930 or from the service provider operating host computer 910, or both. While OTT connection 950 is active, the network infrastructure may further take decisions by which it dynamically changes the routing (e.g., on the basis of load balancing consideration or reconfiguration of the network).

Wireless connection 970 between UE 930 and base station 920 is in accordance with the teachings of the embodiments described throughout this disclosure. One or more of the various embodiments improve the performance of OTT services provided to UE 930 using OTT connection 950, in which wireless connection 970 forms the last segment. More precisely, the teachings of these embodiments may improve reduce unnecessary signaling, and improve data rate, latency, and power consumption, and thereby provide benefits such as higher bandwidth, reduced user waiting time, relaxed restriction on file size, and better responsiveness.

A measurement procedure may be provided for the purpose of monitoring data rate, latency and other factors on which the one or more embodiments improve. There may further be an optional network functionality for reconfiguring OTT connection 950 between host computer 910 and UE 930, in response to variations in the measurement results. The measurement procedure and/or the network functionality for reconfiguring OTT connection 950 may be implemented in software 911 and hardware 915 of host computer 910 or in software 931 and hardware 935 of UE 930, or both. In embodiments, sensors (not shown) may be deployed in or in association with communication devices through which OTT connection 950 passes; the sensors may participate in the measurement procedure by supplying values of the monitored quantities exemplified above, or supplying values of other physical quantities from which software 911, 931 may compute or estimate the monitored quantities. The reconfiguring of OTT connection 950 may include message format, retransmission settings, preferred routing etc.; the reconfiguring need not affect base station 920, and it may be unknown or imperceptible to base station 920. Such procedures and functionalities may be known and practiced in the art. In certain embodiments, measurements may involve proprietary UE signaling facilitating host computer 910's measurements of throughput, propagation times, latency and the like. The measurements may be implemented in that software 911 and 931 causes messages to be transmitted, in particular empty or 'dummy' messages, using OTT connection 950 while it monitors propagation times, errors etc.

Figure 10:
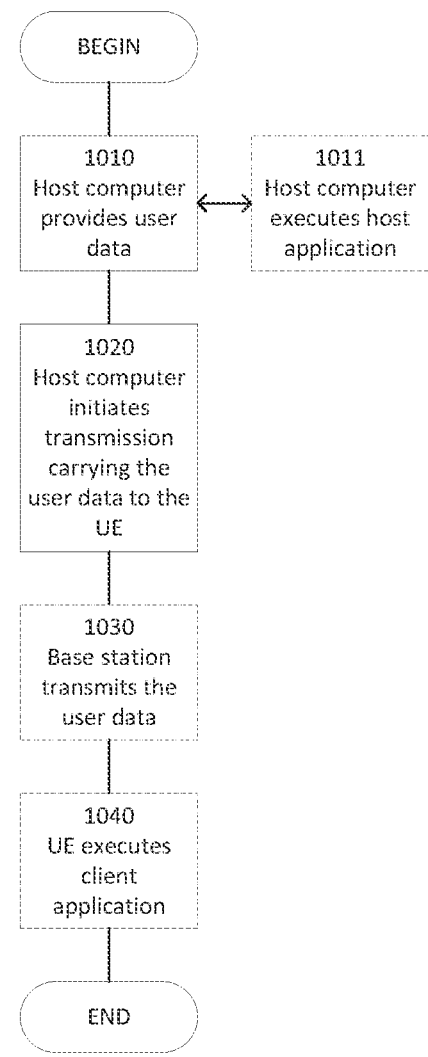
FIG. 10 is a flowchart illustrating a process.

FIG. 10 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 10 will be included in this section. In step 1010, the host computer provides user data. In substep 1011 (which may be optional) of step 1010, the host computer provides the user data by executing a host application. In step 1020, the host computer initiates a transmission carrying the user data to the UE. In step 1030 (which may be optional), the base station transmits to the UE the user data which was carried in the transmission that the host computer initiated, in accordance with the teachings of the embodiments described throughout this disclosure. In step 1040 (which may also be optional), the UE executes a client application associated with the host application executed by the host computer.

Figure 11:
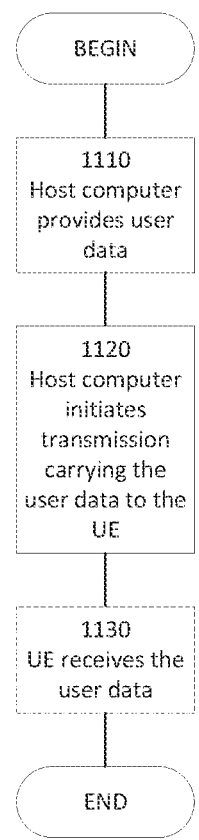
FIG. 11 is a flowchart illustrating a process.

FIG. 11 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 11 will be included in this section. In step 1110 of the method, the host computer provides user data. In an optional substep (not shown) the host computer provides the user data by executing a host application. In step 1120, the host computer initiates a transmission carrying the user data to the UE. The transmission may pass via the base station, in accordance with the teachings of the embodiments described throughout this disclosure. In step 1130 (which may be optional), the UE receives the user data carried in the transmission.

Figure 12:
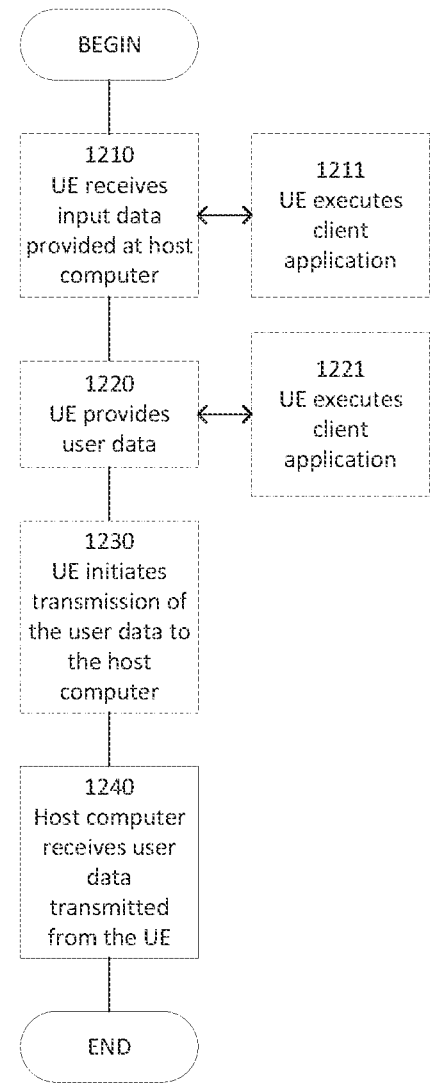
FIG. 12 is a flowchart illustrating a process.

FIG. 12 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 12 will be included in this section. In step 1210 (which may be optional), the UE receives input data provided by the host computer. Additionally or alternatively, in step 1220, the UE provides user data. In substep 1221 (which may be optional) of step 1220, the UE provides the user data by executing a client application. In substep 1211 (which may be optional) of step 1210, the UE executes a client application which provides the user data in reaction to the received input data provided by the host computer. In providing the user data, the executed client application may further consider user input received from the user. Regardless of the specific manner in which the user data was provided, the UE initiates, in substep 1230 (which may be optional), transmission of the user data to the host computer. In step 1240 of the method, the host computer receives the user data transmitted from the UE, in accordance with the teachings of the embodiments described throughout this disclosure.

Figure 13:
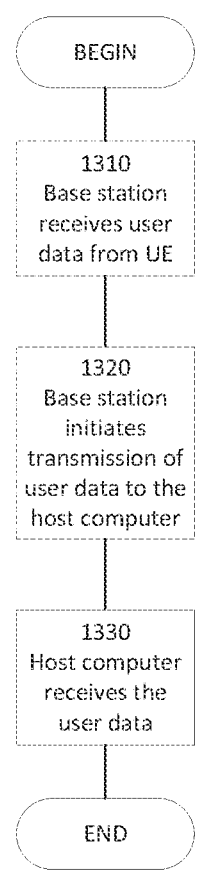
FIG. 13 is a flowchart illustrating a process.

FIG. 13 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 13 will be included in this section. In step 1310 (which may be optional), in accordance with the teachings of the embodiments described throughout this disclosure, the base station receives user data from the UE. In step 1320 (which may be optional), the base station initiates transmission of the received user data to the host computer. In step 1330 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Figure 14:
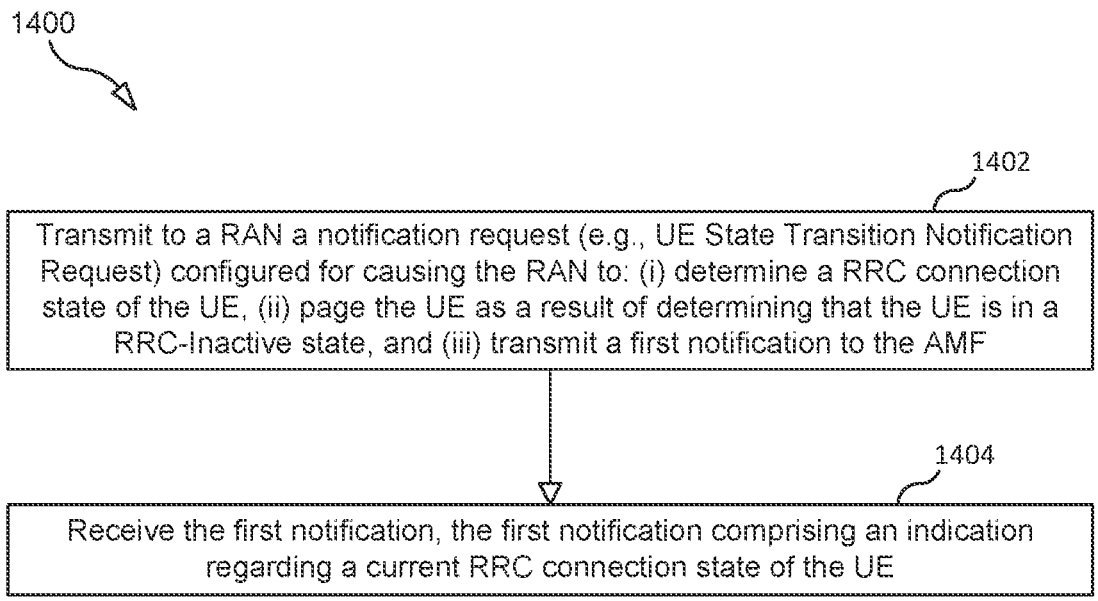
FIG. 14 is a flowchart illustrating a process.

FIG. 14 illustrates an exemplary method 1400 for establishing reachability to a UE. In some embodiments, the method may be performed by an AMF. The method may begin in step 1402, in which the AMF may transmit to a RAN (e.g., a base station) a notification request (e.g., UE State Transition Notification Request) configured for causing the RAN to: (i) determine a RRC connection state of the UE, (ii) page the UE as a result of determining that the UE is in a RRC-Inactive state, and (iii) transmit a first notification to the AMF. The AMF may receive the first notification (step 1404). The first notification may include an indication regarding a current RRC connection state of the UE.

In some embodiments, the method may further include receiving a message from a core network (CN) node, the message from the CN node comprising an instruction to put the UE in the RRC-connected state. In some embodiments, the notification request may be configured for causing the RAN to transmit the first notification after paging the UE.

In some embodiments, the first notification received from the RAN may include UE location information. In some embodiments, the UE location information may include cell identity information and tracking area identity (TAI) information.

In some embodiments, the first notification request may include a first instruction (e.g., a reachability indicator) configured for causing the RAN to: (i) determine the RRC connection state of the UE and (ii) page the UE as a result of determining that the UE is in a RRC-Inactive state.

In some embodiments, the notification request may further include a second instruction (e.g., a particular reporting type indicator, such as "RRC-Connected state notification") configured for causing the RAN to transmit a second notification if the first notification does not comprise an indication that the UE is in the RRC-connected state.

In some embodiments, the second instruction may be configured for causing the RAN to transmit the second notification when the RRC connection state of the UE transits from the RRC-Inactive state to the RRC-connected state. In some embodiments, the second instruction may be further configured for causing the RAN to transmit no other notifications between the first notification and the second notification.

In some embodiments, the notification request may further include an instruction (e.g., a particular reporting type indicator, such as "RRC-Connected state notification") configured for causing the RAN to cease transmitting notifications regarding the RRC connection state of the UE after the RAN has transmitted a notification comprising an indication that the UE is in the RRC-connected state.

In some embodiments, the notification request may be further configured for causing the RAN to transmit no other notifications regarding the RRC connection state of the UE between the steps of determining the RRC connection state of the UE transmitting the first notification to the AMF.

Figure 15:
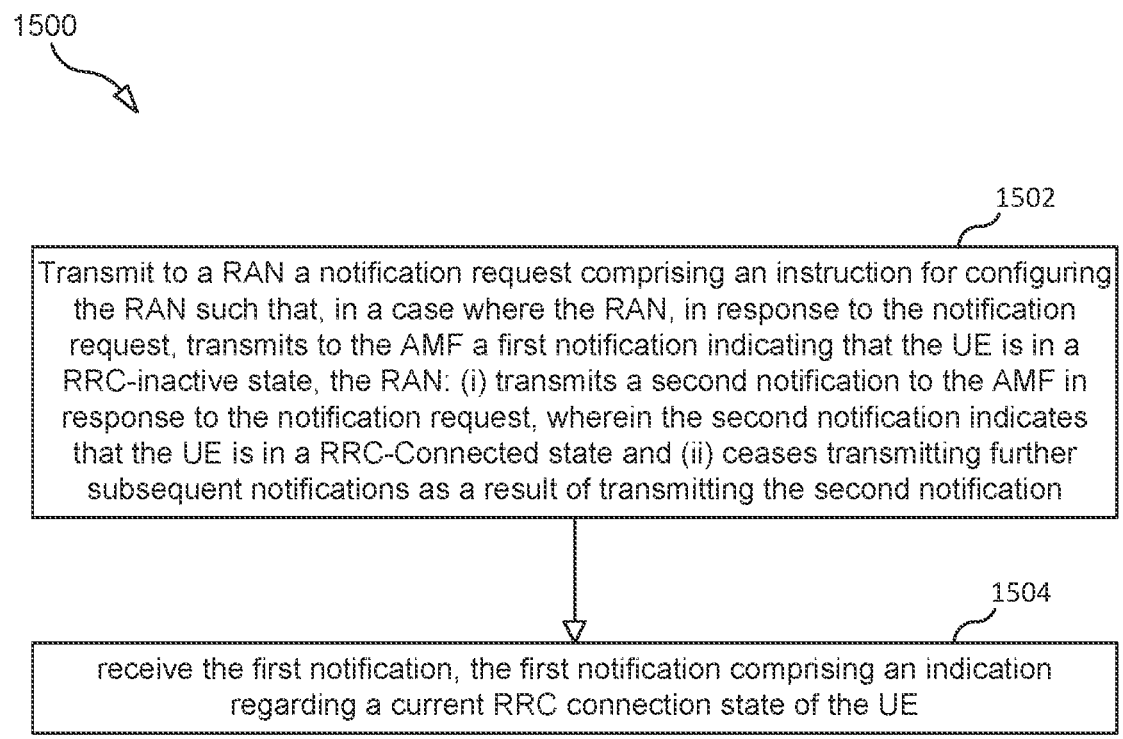
FIG. 15 is a flowchart illustrating a process.

FIG. 15 illustrates an exemplary method 1500 for obtaining state information regarding a UE. In some embodiments, the method may be performed by an AMF. In some embodiments, method 1500 may being in step 1502, in which an AMF may transmit to a RAN a notification request (e.g., UE State Transition Notification Request) including an instruction (e.g., a particular reporting type indicator) for configuring the RAN such that, in a case where the RAN, in response to the notification request, transmits to the AMF a first notification indicating that the UE is in a RRC-Inactive state, the RAN: (i) transmits a second notification to the AMF in response to the notification request, wherein the second notification indicates that the UE is in a RRC-connected state and (ii) ceases transmitting further subsequent notifications as a result of transmitting the second notification. The AMF may receive the first notification from the RAN (step 1504). In some embodiments, the first notification may include an indication regarding the RRC connection state of the UE.

In some embodiments, the instruction may be further configured for causing the RAN to transmit no other notifications between the first notification and the second notification.

In some embodiments, the AMF may receive a message from a CN. In some embodiments, the message from the CN node may include an instruction to put the UE in the RRC-connected state.

In some embodiments, the notification request may be configured for causing the RAN to transmit the first notification after paging the UE.

In some embodiments, the first notification may include UE location information. In some embodiments, the UE location information may include cell identity information and tracking area identity (TAI) information.

In some embodiments, the notification request may be further configured for causing the RAN to, determine a RRC state of the UE, and as a result of determining that the UE is in a RRC-connected state, transmit the notification to the AMF without paging the UE.

In some embodiments, the notification request further comprises a reachability indicator for causing the RAN to (i) determine a RRC connection state of the UE, and (ii) page the UE as a result of the RAN determining that the UE is in a RRC-Inactive state.

In some embodiments, the notification request may be further configured for causing the RAN to transmit no other notifications regarding the RRC connection state of the UE between the steps of determining the RRC connection state of the UE and transmitting the first notification to the AMF.

Figure 16:
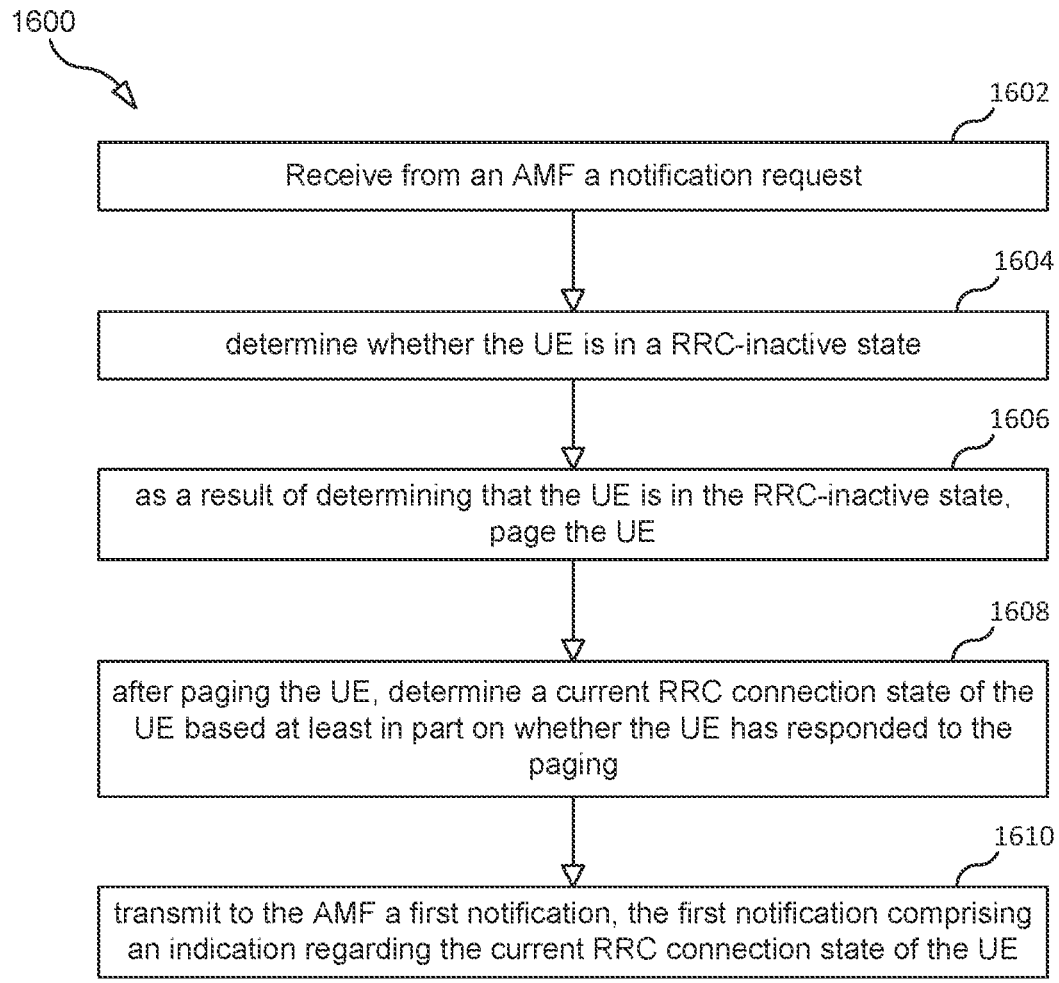
FIG. 16 is a flowchart illustrating a process.

FIG. 16 illustrates an exemplary method 1600 for determining a reachability state of a UE. In some embodiments, the method may be performed by a RAN. In some embodiments, the RAN may receive from an AMF a notification request (step 1602). In response to receiving the notification request, the RAN may determine whether the UE is in a RRC-Inactive state (step 1604). As a result of determining that the UE is in the RRC-Inactive state, the RAN may page the UE (step 1606). After paging the UE, the RAN may determine a current RRC connection state of the UE based at least in part on whether the UE has responded to the paging (step 1608). The RAN may transmit to the AMF a first notification (step 1610), the first notification including an indication regarding the current RRC connection state of the UE.

In some embodiments, the RAN may receive UE location information from the UE when the UE responds to paging. In some embodiments, the first notification comprises the UE location information. In some embodiments, the UE location information may include comprises cell identity information and TAI information.

In some embodiments, the RAN may transmit no other notifications regarding the RRC connection state of the UE between the steps of determining the RRC connection state of the UE and transmitting the first notification.

In some embodiments, the RAN may, after paging the UE, determine that the UE did not transit to an RRC-connected state in response to the paging, and based at least in part on the notification request and the determination that the UE did not transit to an RRC-connected state in response to the paging, transmitting to the AMF a second notification.

In some embodiments, the second notification may be transmitted when the RRC connection state of the UE transits to the RRC-connected state. In some embodiments, the RAN may transmit no other notifications regarding the RRC connection state of the UE between the first notification and the second notification.

In some embodiments, the RAN may, based at least in part on the notification request, cease transmitting notifications regarding the RRC connection state of the UE as a result of having transmitted a notification comprising an indication that the UE is in the RRC-connected state.

In some embodiments, the RAN may determine whether the notification request comprises a reachability indicator. In some embodiments, the step of paging the UE may be performed as a result of determining that the notification request comprises the reachability indicator and that the UE is in the inactive state.

Figure 17:
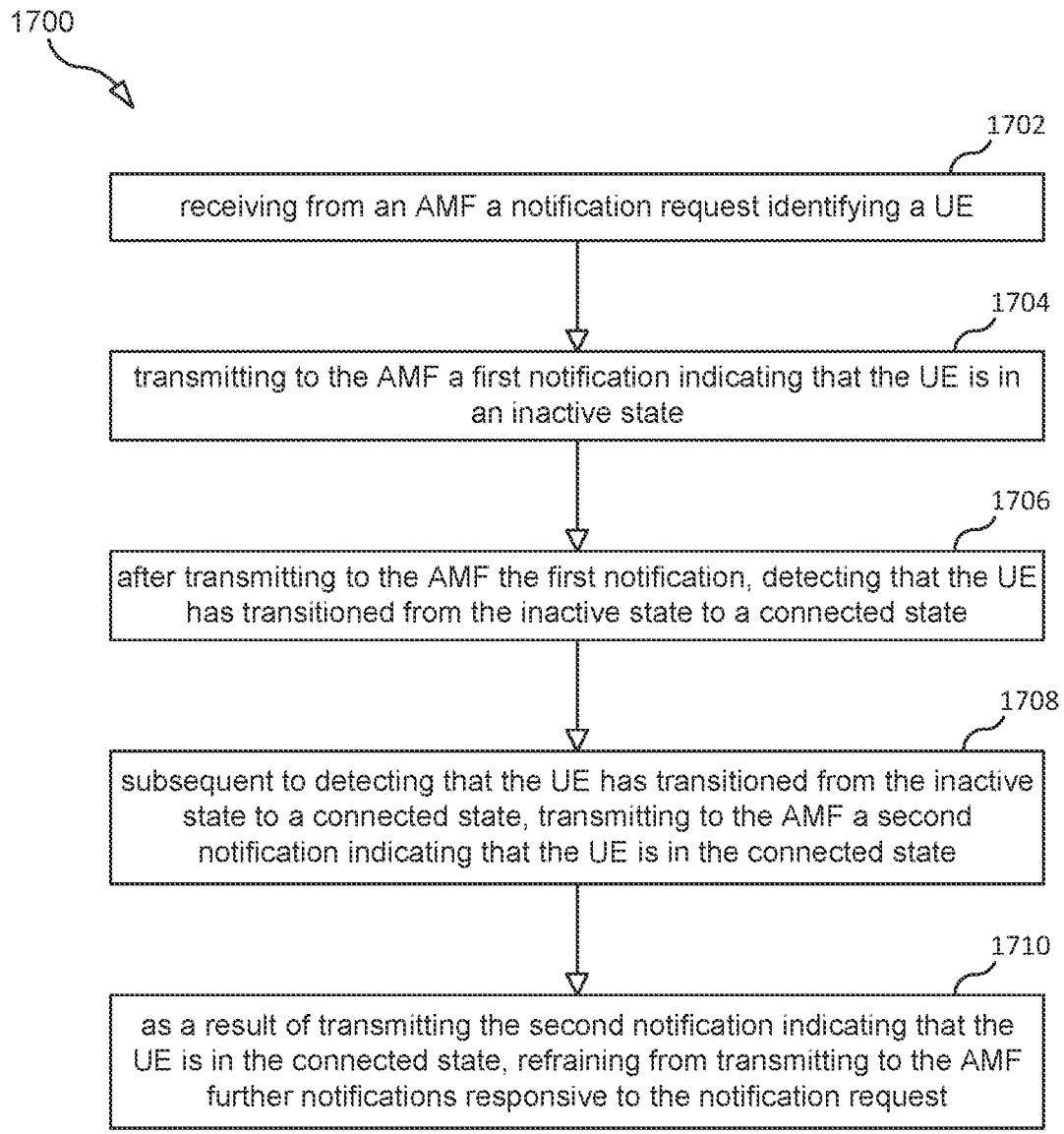
FIG. 17 is a flowchart illustrating a process.

FIG. 17 illustrates an exemplary method 1700 for providing state information regarding a UE. In some embodiments, the method may be performed by a RAN. In some embodiments, the RAN may receive from AMF a notification request identifying the UE (step 1702). In response, the RAN may transmit to the AMF a first notification indicating that the UE is in an inactive state (step 1704). After transmitting to the AMF the first notification, the RAN may detect that the UE has transitioned from the inactive state to an active state (step 1706). Subsequent to detecting that the UE has transitioned from the inactive state to an active state, the RAN may transmit to the AMF a second notification indicating that the UE is in the active state (step 0708). As a result of transmitting the second notification indicating that the UE is in the active state, the RAN may refrain from transmitting to the AMF further notifications responsive to the notification request (step 1710).

Figure 18:
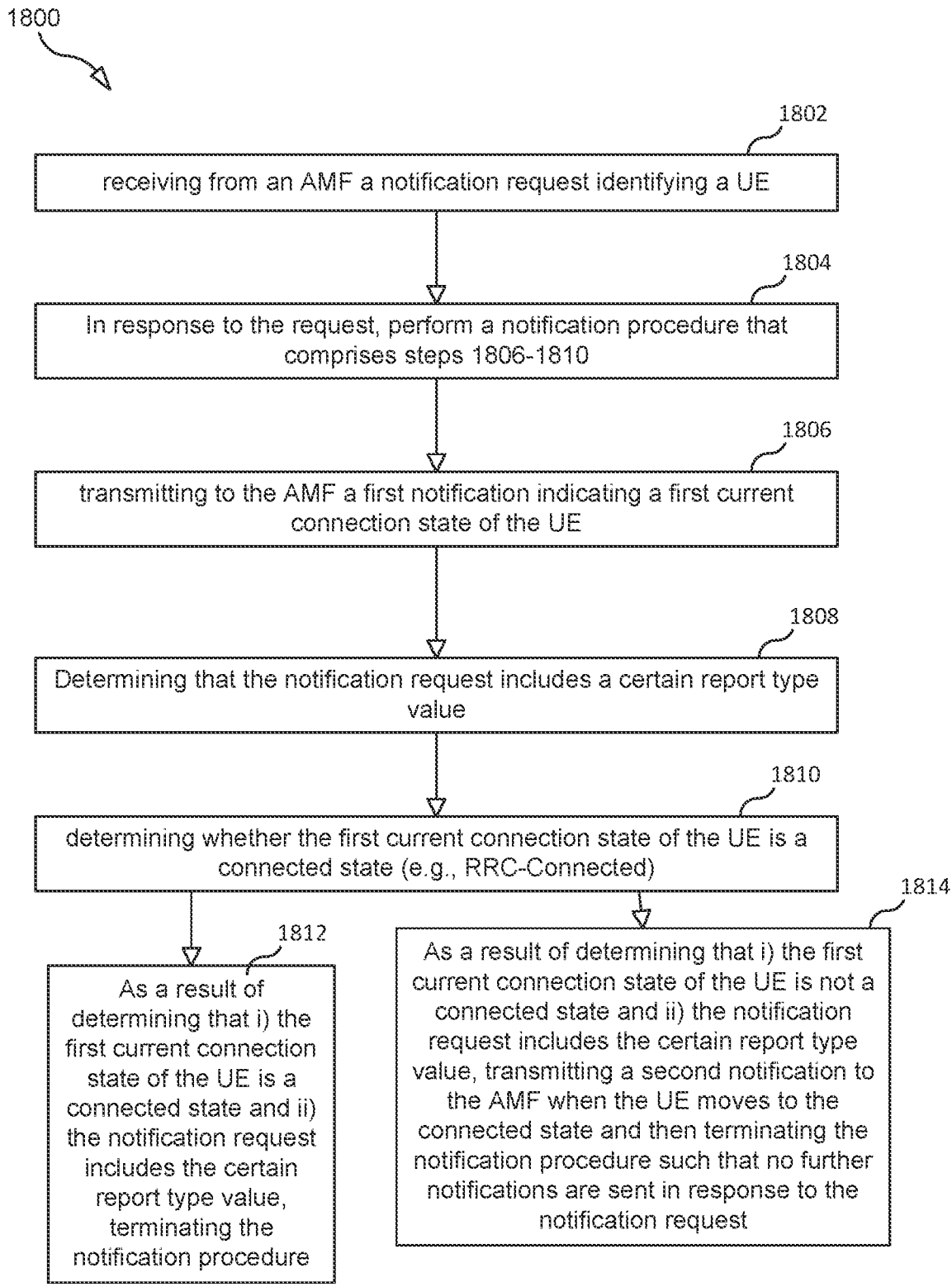
FIG. 18 is a flowchart illustrating a process.

FIG. 18 illustrates an exemplary method 1800 for providing state information regarding a UE. In some embodiments, the method may be performed by a RAN. In some embodiments, the RAN may receive from AMF a notification request identifying the UE (step 1802). In response, the RAN performs a notification procedure that comprises steps 1806-1810 and one of 1812 and 1814. In step 1806, RAN transmits to the AMF a first notification indicating a first current connection state of the UE. In step 508, RAN determines that the notification request includes a certain report type value (e.g., "RRC-Connected state notification"). In step 510, RAN determines whether the first current connection state is a connected state (e.g., RRC-Connected). In step 512, as a result of determining that i) the first current connection state of the UE is a connected state and ii) the notification request includes the certain report type value, RAN terminates the notification procedure (i.e., RAN does not send any further notifications to the AMF in response to the notification request). In step 514, as a result of determining that i) the first current connection state of the UE is a connected state and ii) the notification request includes the certain report type value, RAN transmits a second notification to the AMF when the UE moves to the connected state and then terminates the notification procedure such that no further notifications are sent in response to the notification request.

Figure 19:
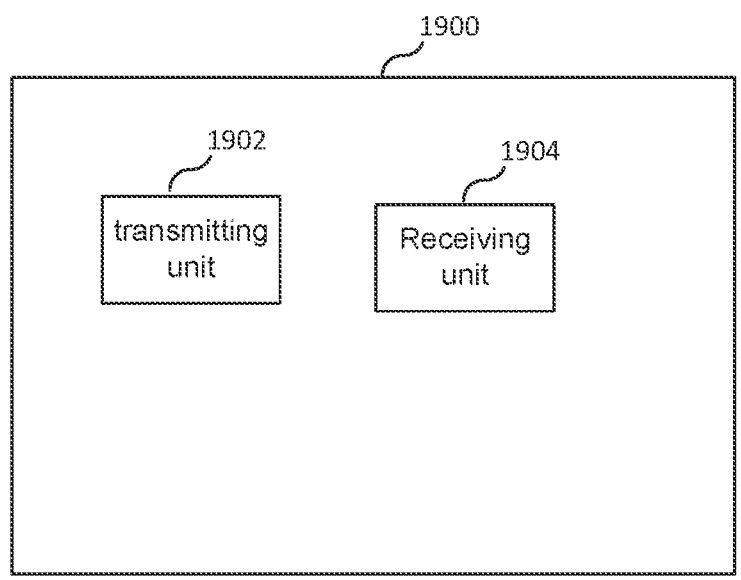
FIG. 19 is a functional block diagram.

FIG. 19 illustrates a schematic block diagram of an apparatus 1900 in a wireless network (for example, the wireless network shown in FIG. 5). The apparatus may be implemented in a network node (e.g., a core network node comprising an AMF). Apparatus 1900 is operable to carry out the example methods described with reference to FIGS. 14 and 15 and and possibly any other processes or methods disclosed herein. It is also to be understood that the method of FIG 14 and/or 15 is not necessarily carried out solely by apparatus 1900. At least some operations of the method can be performed by one or more other entities.

Virtual Apparatus 1900 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause transmitting unit 1902 and receiving unit 1904 and any other suitable units of apparatus 1900 to perform corresponding functions according one or more embodiments of the present disclosure.

As illustrated in FIG. 19, apparatus 1900 includes a transmitting unit 1902 configured to transmit to notification requests to a RAN, such as the notification requests described above, and a receiving unit 1904 configured to receive notifications transmitted by a RAN.

Figure 20:
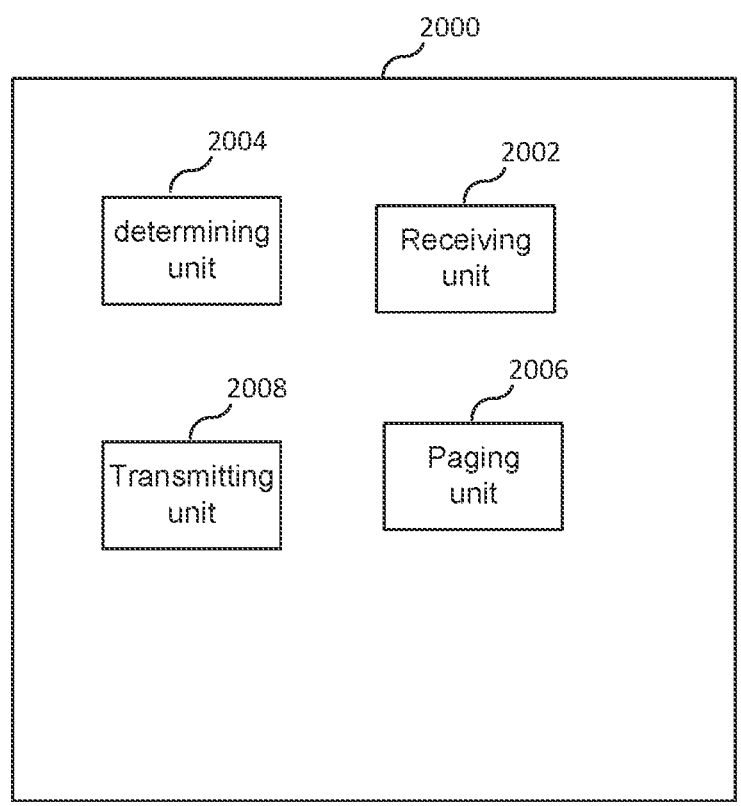
FIG. 20 is a functional block diagram.

FIG. 20 illustrates a schematic block diagram of an apparatus 2000 in a wireless network (for example, the wireless network shown in FIG. 5). The apparatus may be implemented in a network node (e.g., a base station). Apparatus 2000 is operable to carry out the example methods described with reference to FIG. 16 and possibly any other processes or methods disclosed herein. It is also to be understood that the method of FIG. 13 is not necessarily carried out solely by apparatus 2000. At least some operations of the method can be performed by one or more other entities.

Virtual Apparatus 2000 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving unit 2002, determining unit 2004, paging unit 2006, transmitting unit 2008, and any other suitable units of apparatus 2000 to perform corresponding functions according one or more embodiments of the present disclosure.

Figure 21:
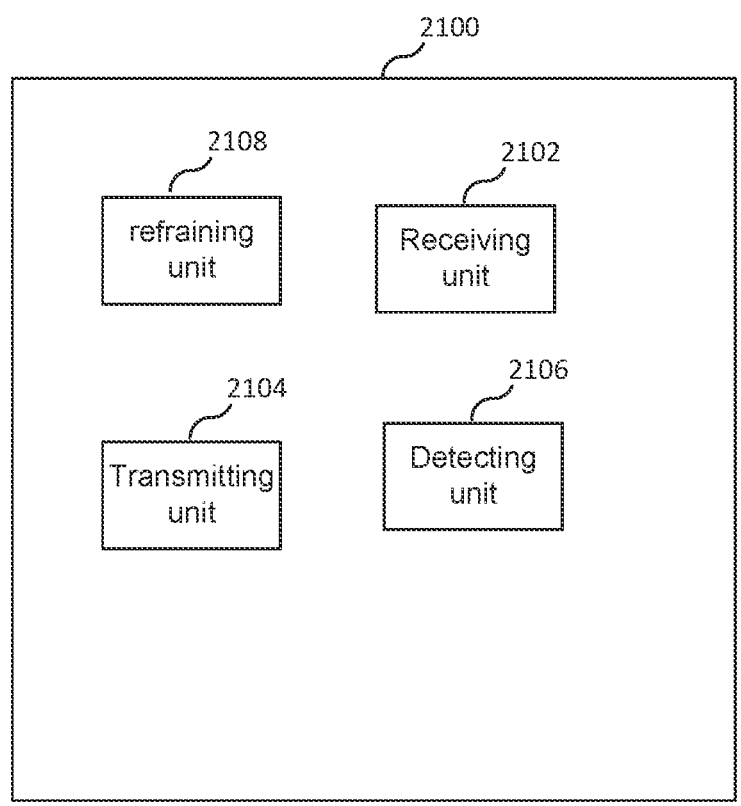
FIG. 21 is a functional block diagram.

As illustrated in FIG. 21, apparatus 2000 includes a receiving unit 2002 configured to receive a notification request transmitted by an AMF (which notification request may identify a UE), a determining unit 2004 configured to whether the UE is in a RRC-Inactive state, a paging unit 2006 for paging the UE when the UE is determined to be in the inactive state, and transmitting unit 2008 for transmitting to the AMF a notification comprising an indication regarding the current RRC connection state of the UE. The determining unit 2004 is also configured to determine the UE's current RRC connection status after the paging unit 2006 pages the UE.

FIG. 21 illustrates a schematic block diagram of an apparatus 2100 in a wireless network (for example, the wireless network shown in FIG. 5). The apparatus may be implemented in a network node (e.g., a base station). Apparatus 2100 is operable to carry out the example methods described with reference to FIG. 17 and possibly any other processes or methods disclosed herein. It is also to be understood that the method of FIG. 17 is not necessarily carried out solely by apparatus 2100. At least some operations of the method can be performed by one or more other entities.

Virtual Apparatus 2100 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving unit 2102, transmitting unit 2104, detecting unit 2106, refraining unit 2108, and any other suitable units of apparatus 2100 to perform corresponding functions according one or more embodiments of the present disclosure.

As illustrated in FIG. 21, apparatus 2100 includes a receiving unit 2102 configured to receive a notification request transmitted by an AMF (which notification request may identify a UE), a transmitting unit 2104 configured to transmit to the AMF a first notification indicating an RRC connection state of the UE (e.g., inactive), a detecting unit 2106 for detecting when the UE moves from the inactive to the active state, wherein when the detecting unit 2106 detects that the UE has moved to the active state the transmitting unit 2104 may is employed to transmit a second notification to the AMF, and a refraining unit 2108 for refraining from transmitting any further notifications to the AMF in response to the notification request received from the AMF.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Embodiments

Group A Embodiments—UE

A1. A method for establishing reachability to a wireless device, the method being performed by a wireless device, the method comprising:

receiving from a page from a radio access node (RAN), the RAN configured to perform any of the methods of B20-B29, the RAN being further configured to receive notification requests from an access and mobility function (AMF) configured to perform any of the methods of B1-B19, in response to the page, transmitting a message to the RAN.

A2. The method of A1, further comprising:
providing user data; and
forwarding the user data to a host computer via the transmission to the base station.

Group B Embodiments—Base Station

B1. A method for establishing reachability to a user equipment (UE), the method comprising:
an AMF transmitting to a radio access node (RAN) a notification request (e.g., UE State Transition Notification Request) configured for causing the RAN to: (i) determine a radio resource control (RRC) connection state of the UE, (ii) page the UE as a result of determining that the UE is in a RRC-Inactive state, and (iii) transmit a first notification to the AMF;
the AMF receiving the first notification, the first notification comprising an indication regarding a current RRC connection state of the UE.

B2. The method of B1, further comprising receiving a message from a core network (CN) node, the message from the CN node comprising an instruction to put the UE in the RRC-connected state.

B3. The method of B2, wherein the notification request is configured for causing the RAN to transmit the first notification after paging the UE.

B4. The method of any of the previous embodiments, wherein the first notification received from the RAN comprises UE location information.

B5. The method of B4, wherein the UE location information comprises cell identity information and tracking area identity (TAI) information.

B6. The method of any of the previous embodiments, wherein the first notification request comprises a first instruction (e.g., a reachability indicator) configured for causing the RAN to: (i) determine the RRC connection state of the UE and (ii) page the UE as a result of determining that the UE is in a RRC-Inactive state.

B7. The method of B6, wherein the notification request further comprises a second instruction (e.g., a reporting type indicator) configured for causing the RAN to transmit a second notification if the first notification does not comprise an indication that the UE is in the RRC-connected state.

B8. The method of B7, wherein the second instruction is configured for causing the RAN to transmit the second notification when the RRC connection state of the UE transits from the RRC-Inactive state to the RRC-connected state and to transmit no other notifications between the first notification and the second notification.

B9. The method of any of the previous embodiments, wherein the notification request further comprises an instruction (e.g., a reporting type indicator) configured for causing the RAN to cease transmitting notifications regarding the RRC connection state of the UE after the RAN has transmitted a notification comprising an indication that the UE is in the RRC-connected state.

B10. The method of any of the previous embodiments, wherein the notification request is further configured for causing the RAN to transmit no other notifications regarding the RRC connection state of the UE between the steps of determining the RRC connection state of the UE transmitting the first notification to the AMF.

B11. A method for obtaining state information regarding a user equipment (UE), the method comprising:
an AMF transmitting to a radio access node (RAN) a notification request (e.g., UE State Transition Notification Request) comprising an instruction (e.g., a reporting type indicator) for configuring the RAN such that, in a case where the RAN, in response to the notification request, transmits to the AMF a first notification indicating that the UE is in a radio resource control (RRC)-inactive state, the RAN: (i) transmits a second notification to the AMF in response to the notification request, wherein the second notification indicates that the UE is in a RRC-connected state and (ii) ceases transmitting further subsequent notifications as a result of transmitting the second notification;
receiving the first notification from the RAN, the first notification comprising an indication regarding the RRC connection state of the UE.

B12. The method of B11, wherein the instruction is further configured for causing the RAN to transmit no other notifications between the first notification and the second notification.

B13. The method of any of B11-B12, further comprising receiving a message from a core network (CN) node, the message from the CN node comprising an instruction to put the UE in the RRC-connected state.

B14. The method of and of B11-B13, wherein the notification request is configured for causing the RAN to transmit the first notification after paging the UE.

B15. The method of any of B11-B14, wherein the first notification comprises UE location information.

B16. The method of B15, wherein the UE location information comprises cell identity information and tracking area identity (TAI) information.

B17. The method of any of claims B11-B16, wherein the notification request is further configured for causing the RAN to, determine a radio resource control (RRC) state of the UE, and as a result of determining that the UE is in a RRC-connected state, transmit the notification to the AMF without paging the UE.

B18. The method of any of B11-B17, wherein the notification request further comprises a reachability indicator for causing the RAN to (i) determine a radio resource control (RRC) connection state of the UE, and (ii) page the UE as a result of the RAN determining that the UE is in a RRC-Inactive state.

B19. The method of B18, wherein the notification request is further configured for causing the RAN to transmit no other notifications regarding the RRC connection state of the UE between the steps of determining the RRC connection state of the UE and transmitting the first notification to the AMF.

B20. A method for determining a reachability state of a user equipment (UE), the method being performed by a radio access node (RAN), the method comprising:
receiving from an access and mobility function (AMF) a notification request; and
in response to receiving the notification request:
(a) determining whether the UE is in a RRC-Inactive state;
(b) as a result of determining that the UE is in the RRC-Inactive state, paging the UE;
(c) after paging the UE, determining a current RRC connection state of the UE based at least in part on whether the UE has responded to the paging; and (d) transmitting to the AMF a first notification, the first notification comprising an indication regarding the current RRC connection state of the UE.

B21. The method of B20, wherein the RAN receives UE location information from the UE when the UE responds to paging.

B22. The method of B21, wherein the first notification comprises the UE location information.

B23. The method of any of B21 and B22, wherein the UE location information comprises cell identity information and tracking area identity (TAI) information.

B24. The method of any of B20-B23, further comprising:
transmitting no other notifications regarding the RRC connection state of the UE between the steps of determining the RRC connection state of the UE and transmitting the first notification.

B25. The method of any of B20-B24, further comprising:
after paging the UE, determining that the UE did not transit to an RRC-connected state in response to the paging, based at least in part on the notification request and the determination that the UE did not transit to an RRC-connected state in response to the paging, transmitting to the AMF a second notification.

B26. The method of B25, wherein the second notification is transmitted when the RRC connection state of the UE transits to the RRC-connected state, and further wherein the RAN transmits no other notifications regarding the RRC connection state of the UE between the first notification and the second notification.

B27. The method of any of B20-B26, wherein based at least in part on the notification request, the RAN ceases transmitting notifications regarding the RRC connection state of the UE as a result of having transmitted a notification comprising an indication that the UE is in the RRC-connected state.

B28. The method of any one of B20-27, wherein
the method further comprising determining whether the notification request comprises a reachability indicator; and
the step of paging the UE is performed as a result of determining that the notification request comprises the reachability indicator and that the UE is in the inactive state.

B29. A method for providing state information regarding a user equipment (UE), the method being performed by a radio access node (RAN), the method comprising:
receiving from an access and mobility function (AMF) a notification request identifying the UE; and
in response to receiving the notification request:
transmitting to the AMF a first notification indicating that the UE is in an inactive state;
after transmitting to the AMF the first notification, detecting that the UE has transitioned from the inactive state to an active state;
subsequent to detecting that the UE has transitioned from the inactive state to an active state, transmitting to the AMF a second notification indicating that the UE is in the active state; and
as a result of transmitting the second notification indicating that the UE is in the active state, refraining from transmitting to the AMF further notifications responsive to the notification request.

B30. A method for providing state information regarding a UE, the method being performed by a RAN (e.g., base station) and comprising:
receiving from an AMF a notification request identifying the UE; and in response to the notification request, performing a notification procedure comprising: transmitting to the AMF a first notification indicating a first current connection state of the UE;
determining that the notification request includes a certain report type value (e.g., "RRC-Connected state notification");
determining that the first current connection state is a connected state (e.g., RRC-Connected); and
as a result of determining that i) the first current connection state of the UE is a connected state and ii) the notification request includes the certain report type value, terminating the notification procedure such that no further notifications are sent to the AMF in response to the notification request.

B31. A method for providing state information regarding a UE, the method being performed by a RAN (e.g., base station) and comprising:
receiving from an AMF a notification request identifying the UE; and
in response to the notification request, performing a notification procedure comprising:
transmitting to the AMF a first notification indicating a first current connection state of the UE;
determining that the notification request includes a certain report type value (e.g., "RRC-Connected state notification");
determining that the first current connection state is not a connected state (e.g., RRC-Connected); and
as a result of determining that i) the first current connection state of the UE is not a connected state and ii) the notification request includes the certain report type value, transmitting a second notification to the AMF as a result of determining that the UE has moved to the connected state and then terminating the notification procedure such that no further notifications are sent in response to the notification request.

Group C Embodiments

C1. A wireless device for determining a reachability state, the wireless device comprising:
processing circuitry configured to perform any of the steps of any of the Group A embodiments; and
power supply circuitry configured to supply power to the wireless device.

C2. A base station for determining a reachability state, the base station comprising:
processing circuitry configured to perform any of the steps of any of the Group B embodiments;
power supply circuitry configured to supply power to the wireless device.

C3. A user equipment (UE) for determining a reachability state, the UE comprising:
an antenna configured to send and receive wireless signals;
radio front-end circuitry connected to the antenna and to processing circuitry, and configured to condition signals communicated between the antenna and the processing circuitry;
the processing circuitry being configured to perform any of the steps of any of the Group A embodiments;
an input interface connected to the processing circuitry and configured to allow input of information into the UE to be processed by the processing circuitry;
an output interface connected to the processing circuitry and configured to output information from the UE that has been processed by the processing circuitry; and a battery connected to the processing circuitry and configured to supply power to the UE.

C4. A communication system including a host computer comprising:
processing circuitry configured to provide user data; and
a communication interface configured to forward the user data to a cellular network for transmission to a user equipment (UE),
wherein the cellular network comprises a base station having a radio interface and processing circuitry, the base station's processing circuitry configured to perform any of the steps of any of the Group B embodiments.

C5. The communication system of the pervious embodiment further including the base station.

C6. The communication system of the previous 2 embodiments, further including the UE, wherein the UE is configured to communicate with the base station.

C7. The communication system of the previous 3 embodiments, wherein:
the processing circuitry of the host computer is configured to execute a host application, thereby providing the user data; and
the UE comprises processing circuitry configured to execute a client application associated with the host application.

C8. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the base station performs any of the steps of any of the Group B embodiments.

C9. The method of the previous embodiment, further comprising, at the base station, transmitting the user data.

C10. The method of the previous 2 embodiments, wherein the user data is provided at the host computer by executing a host application, the method further comprising, at the UE, executing a client application associated with the host application.

C11. A user equipment (UE) configured to communicate with a base station, the UE comprising a radio interface and processing circuitry configured to performs the of the previous 3 embodiments.

C12. A communication system including a host computer comprising:
processing circuitry configured to provide user data; and
a communication interface configured to forward user data to a cellular network for transmission to a user equipment (UE),
wherein the UE comprises a radio interface and processing circuitry, the UE's components configured to perform any of the steps of any of the Group A embodiments.

C13. The communication system of the previous embodiment, wherein the cellular network further includes a base station configured to communicate with the UE.

C14. The communication system of the previous 2 embodiments, wherein:
the processing circuitry of the host computer is configured to execute a host application, thereby providing the user data; and
the UE's processing circuitry is configured to execute a client application associated with the host application.

C15. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the UE performs any of the steps of any of the Group A embodiments.

C16. The method of the previous embodiment, further comprising at the UE, receiving the user data from the base station.

C17. A communication system including a host computer comprising:
communication interface configured to receive user data originating from a transmission from a user equipment (UE) to a base station,
wherein the UE comprises a radio interface and processing circuitry, the UE's processing circuitry configured to perform any of the steps of any of the Group A embodiments.

C18. The communication system of the previous embodiment, further including the UE.

C19. The communication system of the previous 2 embodiments, further including the base station, wherein the base station comprises a radio interface configured to communicate with the UE and a communication interface configured to forward to the host computer the user data carried by a transmission from the UE to the base station.

C20. The communication system of the previous 3 embodiments, wherein:
the processing circuitry of the host computer is configured to execute a host application; and
the UE's processing circuitry is configured to execute a client application associated with the host application, thereby providing the user data.

C21. The communication system of the previous 4 embodiments, wherein:
the processing circuitry of the host computer is configured to execute a host application, thereby providing request data; and
the UE's processing circuitry is configured to execute a client application associated with the host application, thereby providing the user data in response to the request data.

C22. A method implemented in a communication system including a host computer, a base station and a user equipment (UE), the method comprising:
at the host computer, receiving user data transmitted to the base station from the UE, wherein the UE performs any of the steps of any of the Group A embodiments.

C23. The method of the previous embodiment, further comprising, at the UE, providing the user data to the base station.

C24. The method of the previous 2 embodiments, further comprising:
at the UE, executing a client application, thereby providing the user data to be transmitted; and
at the host computer, executing a host application associated with the client application.

C25. The method of the previous 3 embodiments, further comprising:
at the UE, executing a client application; and
at the UE, receiving input data to the client application, the input data being provided at the host computer by executing a host application associated with the client application,
wherein the user data to be transmitted is provided by the client application in response to the input data.

C26. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group B embodiments.

C27. The communication system of the previous embodiment further including the base station.

C28. The communication system of the previous 2 embodiments, further including the UE, wherein the UE is configured to communicate with the base station.

C29. The communication system of the previous 3 embodiments, wherein:

the processing circuitry of the host computer is configured to execute a host application;

the UE is configured to execute a client application associated with the host application, thereby providing the user data to be received by the host computer.

C30. A method implemented in a communication system including a host computer, a base station and a user equipment (UE), the method comprising:

at the host computer, receiving, from the base station, user data originating from a transmission which the base station has received from the UE, wherein the UE performs any of the steps of any of the Group A embodiments.

C31. The method of the previous embodiment, further comprising at the base station, receiving the user data from the UE.

C32. The method of the previous 2 embodiments, further comprising at the base station, initiating a transmission of the received user data to the host computer.

While various embodiments of the present disclosure are described herein, it should be understood that they have been presented by way of example only, and not limitation. Thus, the breadth and scope of the present disclosure should not be limited by any of the above described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

Abbreviations

At least some of the following abbreviations may be used in this disclosure. If there is an inconsistency between abbreviations, preference should be given to how it is used above. If listed multiple times below, the first listing should be preferred over any subsequent listing(s).

1×RTT CDMA2000 1× Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network

The invention claimed is:

1. A method for providing state information regarding a user equipment (UE), comprising:
  receiving from an access and mobility function (AMF) a notification request identifying the UE and comprising a reporting type indicator;
  after receiving the notification request, transmitting to the AMF a first notification indicating that the UE is in an inactive state;
  after transmitting to the AMF the first notification, detecting that the UE has transitioned from the inactive state to an active state;
  subsequent to detecting that the UE has transitioned from the inactive state to the active state and responsive to the notification request, transmitting to the AMF a second notification indicating that the UE is in the active state; and
  refraining from transmitting to the AMF further notifications responsive to the notification request as a result of i) the reporting type indicator indicating that the AMF is requesting a single connected notification and ii) transmitting the second notification indicating that the UE is in the active state.

2. The method of claim 1, wherein the notification request is a UE State Transition Notification Request.

3. The method of claim 1, wherein the reporting type indicator is an RRC-Connected state notification.

4. The method of claim 1, wherein no other notifications regarding the UE are transmitted to the AMF between the first notification and the second notification are transmitted.

5. The method of claim 1, wherein
  the method is performed by a radio access node (RAN), and
  the notification request is configured for causing the RAN to transmit the first notification after paging the UE.

6. The method of claim 1, wherein the first notification comprises UE location information.

7. The method of claim 6, wherein the UE location information comprises cell identity information and tracking area identity (TAI) information.

8. The method of claim 1, wherein
  the method is performed by a radio access node (RAN), and
  the notification request is further configured for causing the RAN to, determine a radio resource control (RRC) state of the UE, and as a result of determining that the UE is in an RRC- connected state, transmit the second notification to the AMF without paging the UE.

9. The method of claim 1, wherein
  the method is performed by a radio access node (RAN), and
  the notification request further comprises a reachability indicator for causing the RAN to:
  (i) determine a radio resource control (RRC) connection state of the UE, and
  (ii) page the UE as a result of the RAN determining that the UE is in an RRC-Inactive state.

10. A radio access node (RAN) comprising:
  a receiver for receiving from an access and mobility function (AMF) a notification request identifying the UE and comprising a reporting type indicator; and
  processing circuitry, wherein the RAN is configured to:
  after receiving the notification request, transmit to the AMF a first notification indicating a current state of the UE;
  after transmitting to the AMF the first notification, detecting that the UE has transitioned from the current state to a new current state;
  subsequent to detecting that the UE has transitioned from the current state to the new current state and responsive to the notification request, transmit to the AMF a second notification indicating the new current state of the UE; and
  refrain from transmitting to the AMF further notifications responsive to the notification request as a result of: i) the reporting type indicator indicating that the AMF is requesting a single connected notification and ii) determining that the new current state is a connected state.

11. A method performed by a radio access node (RAN) for providing state information regarding a user equipment (UE), the method comprising:
  the RAN receiving from an access and mobility function (AMF) a notification request identifying the UE and comprising a reporting type indicator indicating that the AMF is requesting a single connected notification, wherein at the time the notification request is received the UE is in a connected state; and
  in response to receiving the notification request comprising the reporting type indicator indicating that the AMF is requesting a single connected notification at a time when the UE is in the connected state, the RAN performing the steps of: (1) transmitting to the AMF a notification indicating that the UE is in the connected state followed by (2) refraining from transmitting to the AMF any further notifications responsive to the notification request.

12. A radio access node (RAN) comprising:
a receiver for receiving from an access and mobility function (AMF) a notification request identifying the UE and comprising a reporting type indicator indicating that the AMF is requesting a single connected notification; and
processing circuitry, wherein
the RAN is configured such that, if the RAN recives the notification request at a time when the UE is in a connected state, then, in response to receiving the notification request with the reporting type indicator indicating that the AMF is requesting a single connected notification, the RAN (1) transmits to the AMF a notification indicating that the UE is in the connected state and then (2) refrains from transmitting to the AMF any further notifications responsive to the notification request.

13. A method performed by access and mobility function (AMF) for obtaining state information regarding a user equipment (UE), comprising:
transmitting to a radio access node (RAN) a notification request identifying the UE, wherein
the notification request comprises an instruction that instructs the RAN to:
(i) report to the AMF an initial notification indicating the RRC state of the UE regardless of the RRC state of the UE, and
(ii) (a) transmit to the AMF a single additional notification in the event that the initial notification indicates that the UE is in RRC inactive state and the additional notification indicates the UE is in RRC connected state and (b) refrain from transmitting to the AMF any subsequent notifications after transmitting the single additional notification; and
receiving the initial notification from the RAN.

14. The method of claim 13, wherein the notification request is a UE State Transition Notification Request and the initial notification is an RRC-Connected state notification.

15. The method of claim 13, wherein the notification request is further configured for causing the RAN to, determine an RRC state of the UE, and as a result of determining that the UE is in the RRC connected state, transmit the initial notification to the AMF without paging the UE.

16. The method of claim 13, further comprising receiving from a core network (CN) node a message comprising an instruction to put the UE in the RRC-connected state.

17. The method of claim 13, wherein the notification request is configured for causing the RAN to transmit the initial notification after paging the UE.

18. The method of claim 13, wherein
the initial notification comprises UE location information, and
the UE location information comprises cell identity information and tracking area identity (TAI) information.

19. The method of claim 13, wherein
the notification request further comprises a reachability indicator for causing the RAN to determine an RRC connection state of the UE, and
the reachability indicator is further for causing the RAN to page the UE as a result of the RAN determining that the UE is in a RRC-Inactive state.

20. An access and mobility function (AMF), the AMF comprising:
a transmitter for transmitting to a radio access node (RAN) a notification request identifying a user equipment (UE), wherein
the notification request comprises an instruction that instructs the RAN to:
(i) report to the AMF an initial notification indicating the RRC state of the UE regardless of the RRC state of the UE, and
(ii) (a) transmit to the AMF a single additional notification in the event that the initial notification indicates that the UE is in RRC inactive state and the additional notification indicates the UE is in RRC connected state and (b) refrain from transmitting to the AMF any subsequent notifications after transmitting the single additional notification; and
a receiver for receiving the initial notification from the RAN.

21. The AMF of claim 20, wherein the notification request is a UE State Transition Notification Request and the initial notification is an RRC-Connected state notification.

22. The AMF of claim 20, wherein the notification request is further configured for causing the RAN to, determine an RRC state of the UE, and as a result of determining that the UE is in the RRC connected state, transmit the initial notification to the AMF without paging the UE.

23. The AMF of claim 20, wherein the notification request is configured for causing the RAN to transmit the initial notification after paging the UE.

24. The AMF of claim 20, wherein
the initial notification comprises UE location information, and
the UE location information comprises cell identity information and tracking area identity (TAI) information.

25. The AMF of claim 20, wherein
the notification request further comprises a reachability indicator for causing the RAN to determine an RRC connection state of the UE, and
the reachability indicator is further for causing the RAN to page the UE as a result of the RAN determining that the UE is in a RRC-Inactive state.

* * * * *